(12) United States Patent
Kim et al.

(10) Patent No.: US 12,141,124 B1
(45) Date of Patent: Nov. 12, 2024

(54) DISCOVERING CANDIDATE REFERENTIAL INTEGRITIES IN A DATABASE

(71) Applicant: Teradata US, Inc, San Diego, CA (US)

(72) Inventors: Sung Jin Kim, Buena Park, CA (US); Yinuo Zhang, Los Angeles, CA (US); Mohamed Mahmoud Hafez Mahmoud Abdelrahman, Torrance, CA (US); Paul Geoffrey Brown, Concord, MA (US)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 18/518,813

(22) Filed: Nov. 24, 2023

(51) Int. Cl.
*G06F 16/20* (2019.01)
*G06F 16/23* (2019.01)
*G06F 16/2453* (2019.01)

(52) U.S. Cl.
CPC ...... *G06F 16/2365* (2019.01); *G06F 16/2453* (2019.01)

(58) Field of Classification Search
CPC .......................... G06F 16/2365; G06F 16/2453
See application file for complete search history.

(56) References Cited

U.S. PATENT DOCUMENTS

| | | | | |
|---|---|---|---|---|
| 2005/0097072 A1* | 5/2005 | Brown | ................. | G06N 5/048 |
| 2016/0092554 A1* | 3/2016 | Srinivasan | ......... | G06F 16/9024 707/798 |
| 2019/0050437 A1* | 2/2019 | Goyal | ................ | G06F 16/2272 |

OTHER PUBLICATIONS

Dürsch et al. Inclusion Dependency Discovery: An Experimental Evaluation of Thirteen Algorithms. In Proceedings of the 28th ACM International Conf. on Information and Knowledge Management (CIKM '19), 219-228. 2019 [retrieved Aug. 9, 2024]. Retrieved from : < https://doi.org/10.1145/3357384.3357916 :> (Year: 2019).*
J. Bauckmann, U. Leser, F. Naumann, and V. Tietz. Efficiently Detecting Inclusion Dependencies. In ICDE, pp. 1448-1450 (2007).
F. D. Marchi, S. Lopes, and J.-M. Petit. Unary and n-ary inclusion dependency discovery in relational databases. Journal of Intelligent Information Systems, 32(1):53-73 (2009).
S. Lopes, J.-M. Petit, and F. Toumani. Discovering interesting inclusion dependencies: application to logical database tuning. Information Systems, 27(1):1-19 (2002).

(Continued)

*Primary Examiner* — Kristopher Andersen
(74) *Attorney, Agent, or Firm* — Howard Speight

(57) ABSTRACT

A database system enumerates one-column candidate referential integrities (1CRIs) from a plurality of input columns in one or more relations. The database system applies one or more disqualification tests to the 1CRIs to eliminate illegitimate 1CRIs resulting in a list of non-disqualified 1CRIs, wherein the disqualification tests are applied to an 1CRI being tested (hereinafter (A*,B*), A* representing a set of values of a referenced column or columns and B* representing a set of values of a referencing column or columns) until (A*,B*) is disqualified or until all of the disqualification tests have been executed and (A*,B*) has not been disqualified, in which case (A*,B*) is added to the list of non-disqualified 1CRIs, wherein each of the disqualification tests reduces the likelihood of incorrectly adding (A*,B*) to the list of non-disqualified 1CRIs.

18 Claims, 10 Drawing Sheets

(56) References Cited

OTHER PUBLICATIONS

F. D. Marchi and J.-M. Petit. Zigzag: a new algorithm for mining large inclusion dependencies in databases. ICDM, p. 27-34, (2003).
A. Rostin, O. Albrecht, J. Bauckmann, F. Naumann, U. Leser: A Machine Learning Approach to Foreign Key Discovery. WebDB (2009).
en.wikipedia.org/wiki/Bloom_filter.
www.learndatasci.com/glossary/jaccard-similarity/.

* cited by examiner

Example Cases of Max-Values Test

Example Case #1:
Four greatest values of *Tbl1.col1*: {100, 90, 80, 70}
Four greatest values of *Tbl2.col2*: {100, 70, 80, 75}

Example Case #2:
Four greatest values of *Tbl1.col1*: {100, 90, 80, 70}
Four greatest values of *Tbl2.col2*: {100, 85, 80, 70}

Example Case #3:
Four greatest values of *Tbl1.col1*: {100, 90, 80, 70}
Four greatest values of *Tbl2.col2*: {100, 90, 80, 65}

Example Case #4:
Four greatest values of *Tbl1.col1*: {100, 90, 80, 70}
Four greatest values of *Tbl2.col2*: {100, 70, 65, 60}

Example Case #5:
Four greatest values of *Tbl1.col1*: {100, 90, 80, 70}
Four greatest values of *Tbl2.col2*: {100, 75, 70, 65}

Fig. 10

Example Cases of Min-Values Test

Example Case #1:
Four greatest values of *Tbl1.col1*: {10, 20, 30, 40}
Four greatest values of *Tbl2.col2*: {10, 20, 30, 35}

Example Case #2:
Four greatest values of *Tbl1.col1*: {10, 20, 30, 40}
Four greatest values of *Tbl2.col2*: {10, 25, 30, 40}

Example Case #3:
Four greatest values of *Tbl1.col1*: {10, 20, 30, 40}
Four greatest values of *Tbl2.col2*: {10, 20, 30, 45}

Example Case #4:
Four greatest values of *Tbl1.col1*: {10, 20, 30, 40}
Four greatest values of *Tbl2.col2*: {10, 20, 45, 50}

Example Case #5:
Four greatest values of *Tbl1.col1*: {10, 20, 30, 40}
Four greatest values of *Tbl2.col2*: {10, 25, 30, 45}

Fig. 11

Input:
A set of 1CRIs CRI {cri_1:a_1 <-b_1, cri_2:a_2 <-b_2, ..., cri_na_n<-b_n}

Output:
A set of nCRIs CN

Algorithm:
1 //Preprocessing
2 Generate verified 1CRIs (VCRI) by eliminating 1CRIs, whose members do not reference and are not referenced by other 1CRIs
3
4 //Searching phase
5 CN, TU = {} // initialize
6 PU = VCRI
7 while true do
8     for each candidate n-tuple cn_x in VCRI
9         for each candidate n_tuple cn_y in PU
10             if   1) the referenced columns of cri_x and cri_y (a_x, a_y1,...) are from the same table but different columns, and
11                  2) the referencing columns of cri_x and cri_y (b_x, b_y1,...) are from the same table but different columns, and
12                  3) the referenced columns (a_x, a_y1,...) and the referencing columns (b_x, b_y1,...) are disjoint, and
13                  4) (a_x, a_y1,...) <- (b_x, b_y1,...) is not in TU
14             if (a_x, a_y1,...) <- (b_x, b_y1,...) passes disqualification tests
15                  Add (a_x, a_y1,...) <- (b_x, b_y1,...) to TU
16     if TU = {}
17         break
18     Do the qualification test against TU
19     CN = CN union TU
20     PU = TU
21     TU = {}

Fig. 13

DISCOVERING CANDIDATE REFERENTIAL INTEGRITIES IN A DATABASE

BACKGROUND

Enterprises may be confronted with determining characteristics of a database in order to improve efficiency or some other measure of performance. The database may be a complete unknown, not created by the enterprise, or it may be a database created and maintained by the enterprise. Even databases created and maintained by the enterprise may have characteristics that are not known to the enterprise but which, if known and understood, would be useful to improve performance.

One such characteristic is referential integrity. A referential integrity constraint is a data property that requires every non-NULL value of a column in a relation to exist as a value of another column in the same or a different relation. Referential integrity constraints come in handy for maintaining data consistency/integrity and optimizing queries which reference columns in referential integrity constraints. Discovering candidate referential integrities for a given database, which may become referential integrity constraints upon selection by a user, could be non-trivial especially when a schema of the database is complex and/or when responsible people do not have enough understanding on the dataset.

Discovering candidate referential integrities in a database may be a challenge.

SUMMARY

In one aspect, a method includes executing a plurality of processes on a plurality of compute groups. Each compute group includes one or more compute clusters. Each compute cluster includes one or more nodes. Each node includes at least one computer processor and a memory. The plurality of processes store data on a data storage. A database system executes as at least one of the plurality of processes. The database system is configured to issue executable steps to at least one of the processes executing as part of the database system. The database system receives a database including one or more relations including a plurality of input columns. The database system enumerates one-column candidate referential integrities (1CRIs) from the plurality of input columns in the one or more relations, wherein each 1CRI includes a referenced column (A) having a plurality of referenced-column values and a referencing column (B) having a plurality of referencing column values. The database system applies one or more disqualification tests to the 1CRIs to eliminate illegitimate 1CRIs resulting in a list of non-disqualified 1CRIs, wherein the disqualification tests are applied to an 1CRI being tested (hereinafter (A*,B*), A* representing a set of values of a referenced column or columns and B* representing a set of values of a referencing column or columns) until (A*,B*) is disqualified or until all of the disqualification tests have been executed and (A*,B*) has not been disqualified, in which case (A*,B*) is added to the list of non-disqualified 1CRIs, wherein each of the disqualification tests reduces the likelihood of incorrectly adding (A*,B*) to the list of non-disqualified 1CRIs. The database system applies a qualifying test to the non-disqualified 1CRIs resulting in a list of qualified 1CRIs. The database system defines a referential integrity constraint between the referenced column and the referencing column of one of the qualified 1CRIs that is confirmed by a user to be a referential integrity constraint. The database system uses the referential integrity constraint to optimize execution of a query received by the database system.

Implementations may include one or more of the following. The method may include the database system rejecting an action regarding the database that violates the referential integrity constraint. The qualifying test may identify a non-disqualified 1CRI as a qualified 1CRI if more than a qualification-number-threshold number of referenced-column values in the non-disqualified pair are included in the referencing-column values. Enumerating the 1CRIs may include iteratively pairing each of the plurality of input columns with every other of the plurality of input column. The disqualification tests may include a domain inclusion disqualification test, that includes one or more of the following sub-tests:
  (a1) data type domain match sub-test, in which (A*,B*) is disqualified if a data type of B* is larger than a data type of A*,
  (a2) max-values sub-test, in which (A*,B*) is disqualified if:
    one of an n greatest values of B* is not among an n greatest values of A*, and
    one of the n greatest values of B* is greater than an nth greatest value of A*,
  (a3) min-values sub-test, in which (A*,B*) is disqualified if:
    one of an m smallest values of B* is not among an m smallest values of A*, and
    one of the m smallest values of B* is smaller than an mth smallest value of A*,
  (a4) Bloom-filter sub-test, in which (A*,B*) is disqualified if a Bloom filter of A* is not a superset of a Bloom filter of B*, and
  (a5) number of unique values sub-test, in which (A*,B*) is disqualified if a number of unique values of B* is greater than a number of unique values of A*.

The disqualification tests may include a surrogate key discordance test for A* that includes one or more of the following sub-tests:
  (b1) value start-distance sub-test, in which (A*,B*) is disqualified if:
    a smallest value in A*, an average gap between values in A*, and a standard deviation of value differences between consecutive values in A* indicate that A* is a surrogate key,
  (b2) end-of-a-spectrum sub-test, in which (A*,B*) is disqualified if:
    an m smallest values in A*<=a square root of a number of unique values in A* ($NUV_{A*}$) and
    an m greatest values in A*>$NUV_{A*}$–the square root of $NUV_{A*}$,
    where m<=the square root of $NUV_{A*}$ and $NUV_{A*}$>4, and
  (b3) synthetic key similarity sub-test, in which (A*,B*) is disqualified if:
    a similarity of A* and C* is greater than a key-similarity-threshold,
    where C* is a set of possible surrogate key values.

The disqualification tests may include a minimum support test, in which (A*,B*) is disqualified if a cardinality of B* is less than a minimum-support threshold. The method disqualification tests may include a minimum coverage disqualification test, that includes one or more of the following sub-tests:
  (d1) using cardinality sub-test, in which (A*,B*) is disqualified if:

$NUV_{B*}/NUV_{A*} >$ a domain-coverage threshold, where $NUV_{B*}$ is a number of unique values in B* and $NUV_{A*}$ is a number of unique values in A*, and CARD(Bloom$_{A*}$∩Bloom$_{B*}$)/CARD(Bloom$_{A*}$), where ∩ represents a bitwise AND, CARD is a function having an argument that computes the number of bits in the argument that are set to 1, Bloom$_{A*}$ is a Bloom filter of A*, and Bloom$_{B*}$ is a Bloom filter of B*, and (d2) using Min Hash sub-test, in which in which (A*,B*) is disqualified if (MH(A*,B*)·(NUV$_{A*}$−NUV$_{B*}$)/(MH(A*,B*)+1))/NUV$_{A*}$ is less than a min-hash threshold, where MH(A*,B*) is a statistic available from the database system.

The method may include identifying n-column referential integrities (nCRIs) by the database system enumerating nCRIs among n−1 column CRIs to produce nCRIs, each nCRI having referenced columns and referencing column and the database system applying one or more reduction rules to the nCRIs to eliminate illegitimate nCRIs resulting in a reduced set of nCRIs, wherein the reduction rules are applied to a nCRI under consideration (nCRIUC) until the nCRIUC fails a reduction rules and is found to be illegitimate or until all the reduction rules have been run against the nCRIUC without finding the nCRIUC to be illegitimate, in which case the nCRIUC is added to the reduced set of nCRIs, wherein the reduction rules include:

(a) an nCRIUC is found to be illegitimate if referenced columns in the nCRIUC are not different columns or if they do not belong to a same relation, (b) an nCRIUC is found to be illegitimate if referencing columns in the nCRIUC are not different columns or if they do not belong to a same relation, (c) an nCRIUC is found to be illegitimate if referenced columns in the nCRIUC and referencing columns in the nCRIUC include one or more common columns, The database system may apply the disqualification tests to the reduced set of nCRIs to produce nth-level non-disqualified nCRIs. The one or more disqualification tests uses two or more of the following statistics about (A*,B*):

a data type of A*,
a data type of B*,
a number of unique values in A*(NUVA*),
a number of unique values in B*(NUVB*),
a number of unique values in the intersection of A* and B*(NUV$_{A*∩B*}$),
a MinHash(A*,B*) (abbreviated MH(A*,B*)),
an n greatest values in A*,
an n greatest values in B*,
an m smallest values in A*,
an m smallest values in B*,
a Bloom filter of A*(BloomA*),
a Bloom filter of B*(BloomB*),
a smallest value in A*,
an average gap between consecutive values in A*, defined to be a sum of gaps between consecutive A* values divided by NUVA*−1,
a standard deviation of differences between consecutive values in A*,
a cardinality of A*, and
a cardinality of B*.

In one aspect, a non-transitory computer-readable tangible medium, has a computer program recorded. The computer program includes executable instructions, that, when executed, perform a method. The method includes executing a plurality of processes on a plurality of compute groups. Each compute group includes one or more compute clusters. Each compute cluster includes one or more nodes. Each node includes at least one computer processor and a memory. The plurality of processes store data on a data storage. A database system executes as at least one of the plurality of processes. The database system is configured to issue executable steps to at least one of the processes executing as part of the database system. The database system receives a database including one or more relations including a plurality of input columns. The database system enumerates one-column candidate referential integrities (1CRIs) from the plurality of input columns in the one or more relations, wherein each 1CRI includes a referenced column (A) having a plurality of referenced-column values and a referencing column (B) having a plurality of referencing column values. The database system applying one or more disqualification tests to the 1CRIs to eliminate illegitimate 1CRIs resulting in a list of non-disqualified 1CRIs, wherein the disqualification tests are applied to an 1CRI being tested (hereinafter (A*,B*), A* representing a set of values of a referenced column or columns and B* representing a set of values of a referencing column or columns) until (A*,B*) is disqualified or until all of the disqualification tests have been executed and (A*,B*) has not been disqualified, in which case (A*,B*) is added to the list of non-disqualified 1CRIs, wherein each of the disqualification tests reduces the likelihood of incorrectly adding (A*,B*) to the list of non-disqualified 1CRIs. The database system applies a qualifying test to the non-disqualified 1CRIs resulting in a list of qualified 1CRIs. The database system defines a referential integrity constraint between the referenced column and the referencing column of one of the qualified 1CRIs that is confirmed by a user to be a referential integrity constraint. The database system uses the referential integrity constraint to optimize execution of a query received by the database system.

In one aspect, an article of manufacture includes a system executing a plurality of processes on a plurality of compute groups. Each compute group includes one or more compute clusters. Each compute cluster includes one or more nodes. Each node includes at least one computer processor and a memory. The plurality of processes store data on a data storage. A database system executes as at least one of the plurality of processes. The database system is configured to issue executable steps to at least one of the processes executing as part of the database system. The database system receives a database including one or more relations including a plurality of input columns. The database system enumerates one-column candidate referential integrities (1CRIs) from the plurality of input columns in the one or more relations, wherein each 1CRI includes a referenced column (A) having a plurality of referenced-column values and a referencing column (B) having a plurality of referencing column values. The database system applies one or more disqualification tests to the 1CRIs to eliminate illegitimate 1CRIs resulting in a list of non-disqualified 1CRIs, wherein the disqualification tests are applied to an 1CRI being tested (hereinafter (A*,B*), A* representing a set of values of a referenced column or columns and B* representing a set of values of a referencing column or columns) until (A*,B*) is disqualified or until all of the disqualification tests have been executed and (A*,B*) has not been disqualified, in which case (A*,B*) is added to the list of non-disqualified 1CRIs, wherein each of the disqualification tests reduces the likelihood of incorrectly adding (A*,B*) to the list of non-disqualified 1CRIs. The database system applying a qualifying test to the non-disqualified 1CRIs resulting in a list of qualified 1CRIs. The database system defining a referential integrity constraint between the referenced column and the referencing column of one of the qualified 1CRIs that is confirmed by a user to be a referential integrity constraint. The database system uses the referential integrity constraint to optimize execution of a query received by the database system.

BRIEF DESCRIPTION OF THE DRAWINGS

FIG. 10 shows example cases to illustrate the Max-Values Sub-Test.

FIG. 11 shows example cases to illustrate the Min-Values Sub-Test.

FIG. 13 illustrates algorithmically the process of forming nCRIs.

DETAILED DESCRIPTION (Note: This application references a number of different publications as indicated throughout the specification by one or more reference numbers within brackets [x]. A list of these publications ordered according to these reference numbers can be found below in the section entitled "References." The Reference section may also list some publications that are not explicitly referenced in this application. Each of these publications, including those that are not explicitly referenced, is incorporated by reference herein.)

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

An Example Computer System

Figure 1:
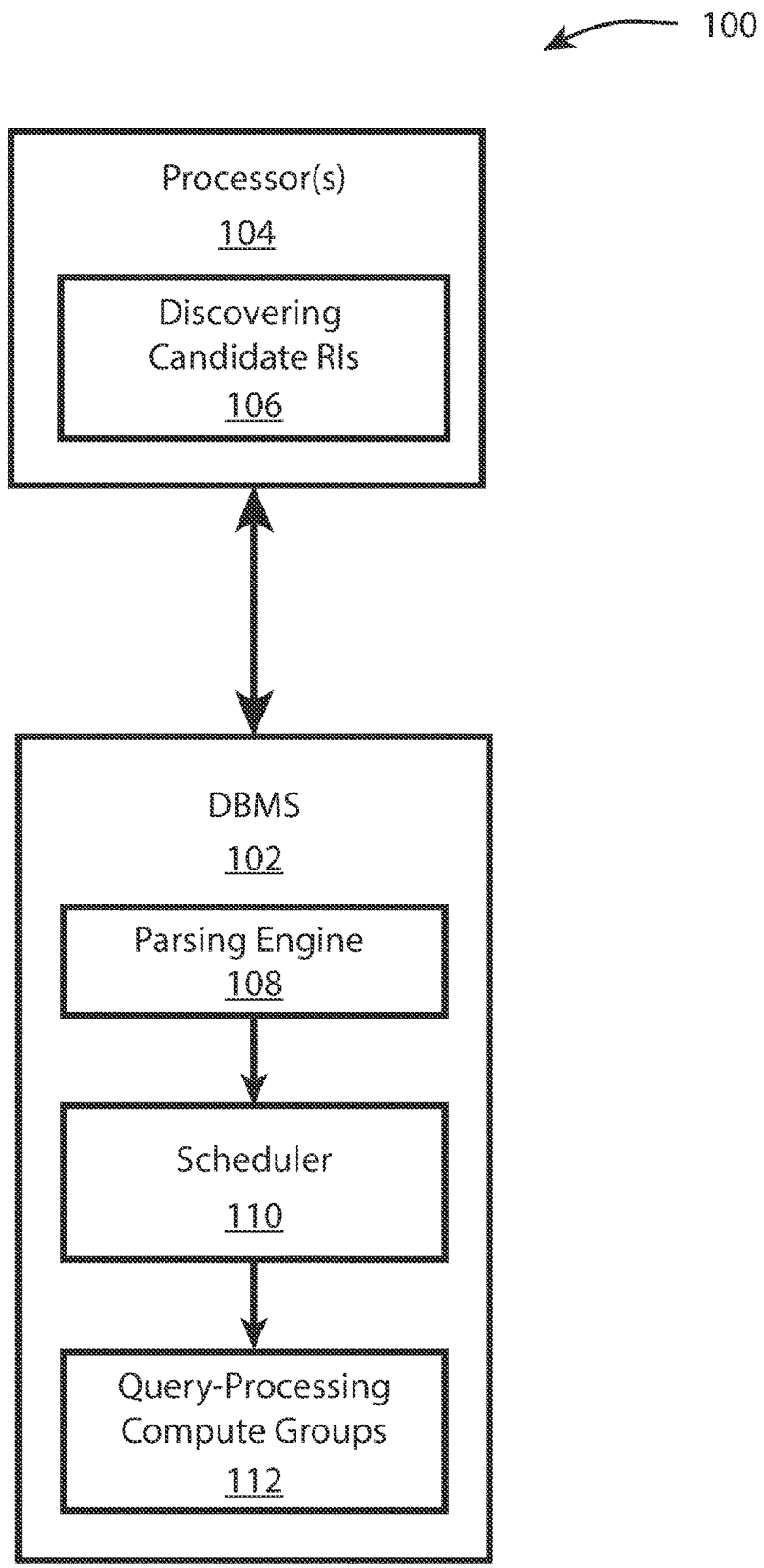
FIG. 1 is one example of a block diagram of a computer system.

The techniques disclosed herein have particular application to, but are not limited to, systems such as the system 100 illustrated in FIG. 1. The system 100 includes a variety of hardware components and software components that may be deployed on an appliance, on commodity hardware, in a private cloud, in a public cloud, in a combination of public and private clouds, and/or in a multi-cloud where cloud users are allowed services from multiple cloud vendors such as Amazon (AWS), Google (GCP), and Microsoft (Azure). The software components are programmed as executable instructions into memory and/or a non-transitory computer-readable medium for execution on the hardware components (including, for example, hardware processors). System 100 includes one or more network connections; the networks can be wired, wireless, or a combination of wired and wireless.

The system 100 implements, among other things, the processing described below in connection with FIGS. 1-14.

An Example Database Management System

The system 100 includes a Database Management System (DBMS) 102, at least one hardware processor 104, and a non-transitory computer-readable storage medium having executable instructions representing discovering candidate referential integrities in a database (abbreviated as "Discovering Candidate RIs") 106 as disclosed herein. Note the distinction between "referential integrity constraints" and "candidate referential integrities." The latter are proposed referential integrity constraints that become official as constraints, becoming referential integrity constraints, only when approved by a user. This should not be interpreted to foreclose the possibility of a software system that can approve candidate referential integrities to become referential integrity constraints.

The DBMS 102 may be a relational DBMS (RDBMS) or it may be another variety of database management system. The DBMS 102 may include a parsing engine 108, discussed below in connection with FIGS. 2 and 3, that organizes the storage of data and the distribution of database table rows and coordinates the retrieval of data from the data-storage facilities in response to queries received from a user. The DBMS 100 usually receives queries and commands to build tables in a standard format, such as Structured Query Language (SQL). The DBMS 102 also includes a scheduler 110 that makes decisions about when (i.e., immediately or delayed) and where executable steps to process a query are to be executed. The DBMS 102 also includes query-processing compute groups 112, that process the query and produce a result.

Figure 2:
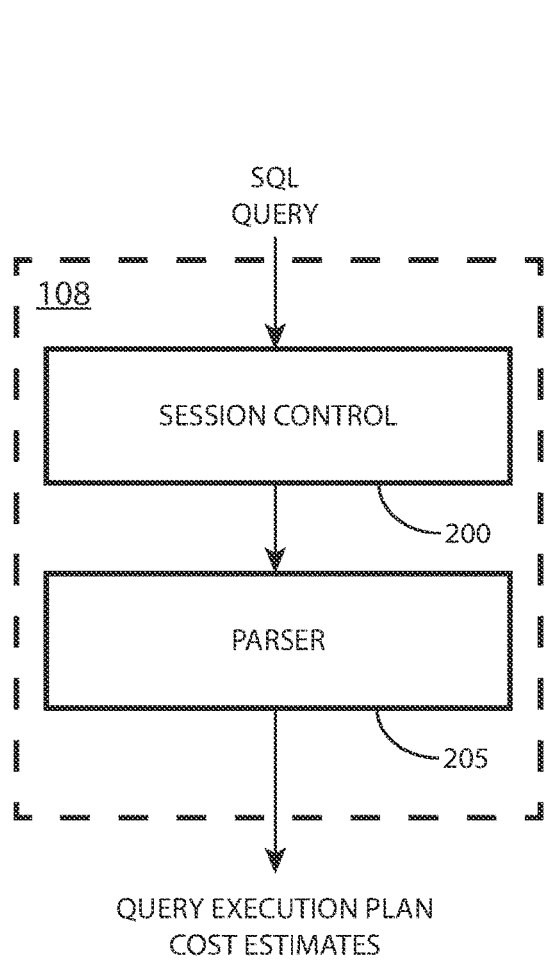
FIG. 2 is one example of a block diagram of a parsing engine.

The parsing engine, shown in FIG. 2, includes a session control 200 that allows a session to begin and a user to submit a SQL query. More broadly, the user may submit a "request," a term that includes database queries, which is processed by the DBMS to produce an output result, and other DBMS actions, such as load utilities to load data from a source to a target, etc. Typically, a query includes one or more predicates. Query predicates, or logical predicates, are types of conditional expressions that specify a condition of a row or group of rows that has one of three possible states: TRUE, FALSE, or NULL (or unknown).

Figure 3:
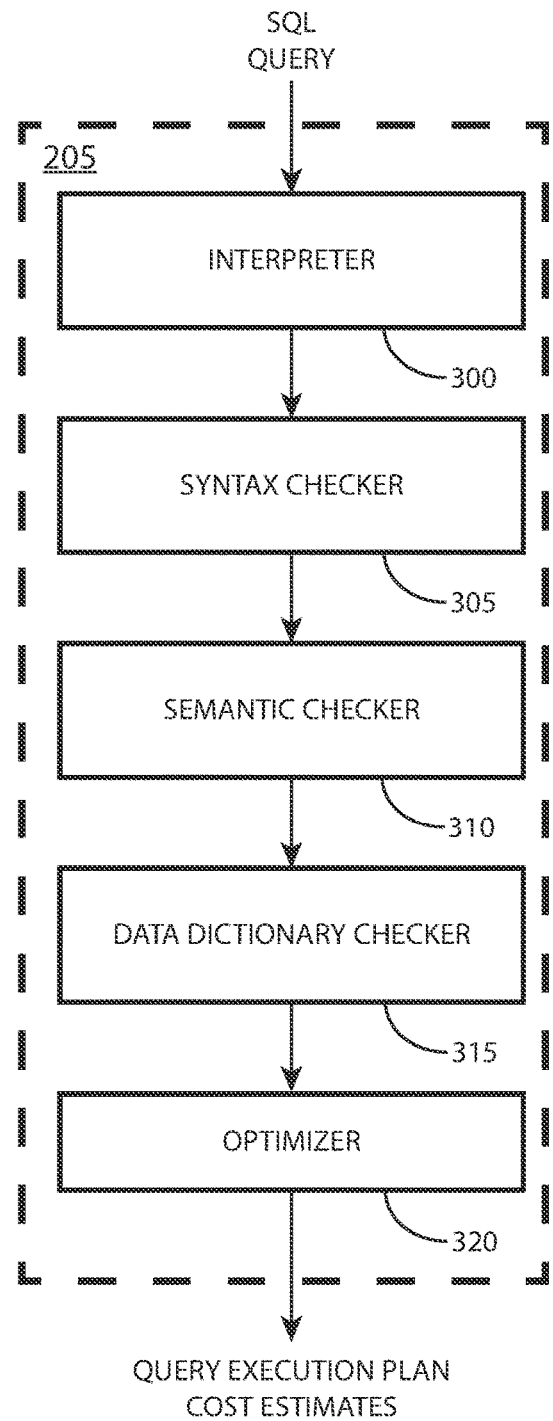
FIG. 3 is one example of a block diagram of a parser.

The SQL query is routed to the parser 205. As illustrated in FIG. 3, the parser 205 interprets the SQL query 300, checks it for proper SQL syntax 305, evaluates it semantically 310, and consults a data dictionary to ensure that all the objects specified in the SQL query actually exist and that the user has the authority to perform the request 315. Finally, the parser 205 runs an optimizer 320, which develops a query execution plan (QEP) to perform the query and produces cost estimates, where the term "cost" in this context has different dimensions, namely time, resource usage, and financial.

Returning to FIG. 1, the scheduler 110 produces executable steps to process the query. These executable steps are sent to query-processing compute groups 112 (compute groups are discussed below) for execution.

A "workload group" (or alternatively "workload") is a set of requests that have common characteristics, such as an application that issued the requests, a source of the requests, type of query, priority, response time goals, throughput, etc. A workload group is defined by a workload definition (WD), which defines characteristics of the workload group as well as various rules associated with the workload group.

An Example Cloud-Based Processing System

Figure 4:
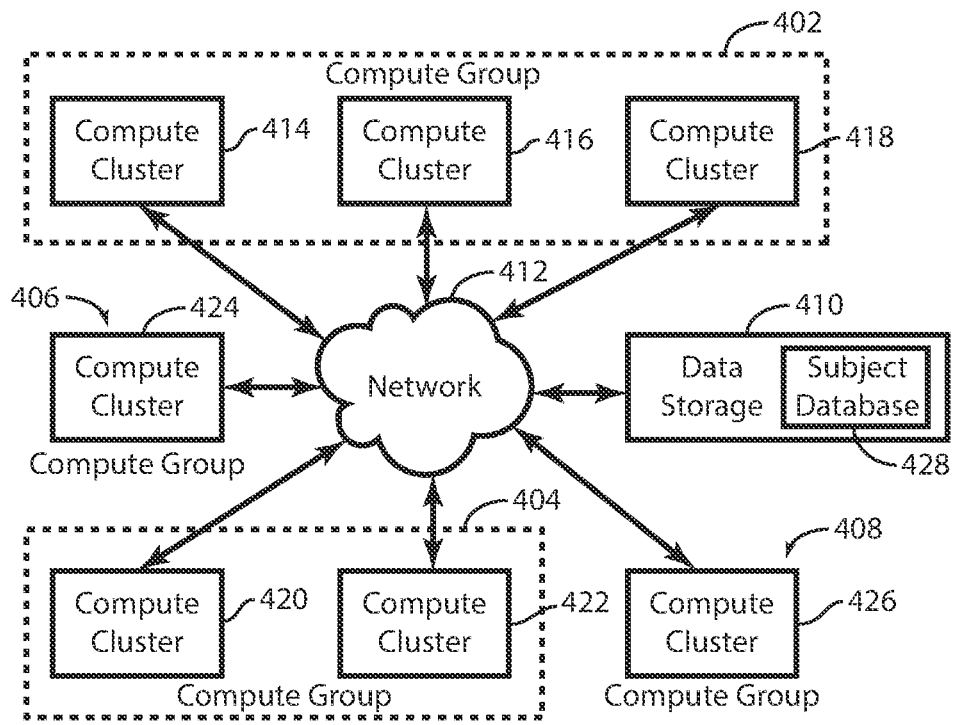
FIG. 4 illustrates a cloud-based processing system.

FIG. 4 illustrates a cloud-based processing system. A cloud-based processing system 400 includes one or more compute groups 402, 404, 406, 408 that communicate with each other and a data storage 410 through a network 412. A compute group is defined as a collection of one or more compute clusters (discussed below in connection with FIG. 5). A compute group's usage may be designated for a particular department or application of an enterprise. For example:

compute group 402, which might be dedicated to the enterprise's Sales department, includes compute clusters 414, 416, and 418, compute group 404, which might be dedicated to the enterprise's market-research application, includes compute clusters 420 and 422, compute group 406, which might be dedicated to the enterprise's Security department, includes compute cluster 424, and compute group 408, which might be dedicated to the enterprise's Engineering department, includes compute cluster 426.

Alternatively, a compute group may be used by multiple departments within an enterprise or by multiple enterprises.

Data storage 410 may include cloud-based object storage, such as Amazon Simple Storage Service (S3) or the Azure Blob Storage, or it may be a data storage system local to the enterprise or a combination of local and cloud-based storage.

Figure 5:
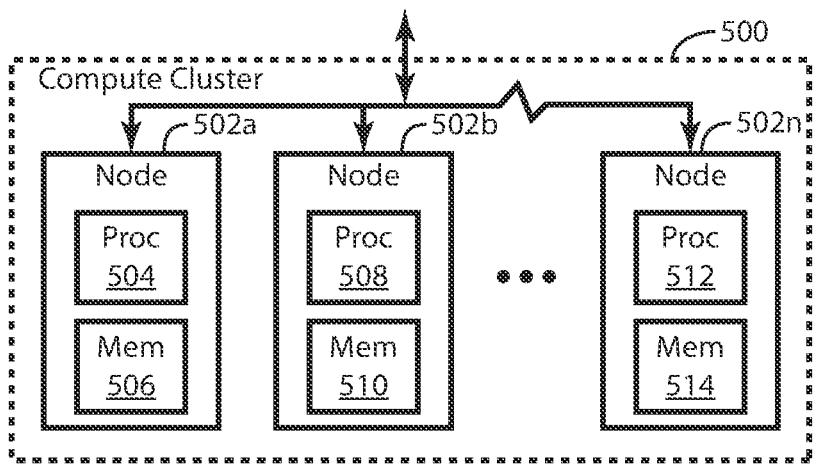
FIG. 5 illustrates a compute cluster.

FIG. 5 illustrates a compute cluster. A compute cluster 500 includes one or more nodes $502a, 502b, \ldots, 502n$. Each node includes a processor and memory. For example:

node 502a includes processor 504 and memory 506,
node 502b includes processor 508 and memory 510, and
node 502n includes processor 512 and memory 514.

Each node $502a, 502b, \ldots, 502n$ may be local to the enterprise or it may be cloud based. If cloud based, the processor and memory may be any of the processor/memory configurations offered by the cloud provider.

Returning to FIG. 4, a subject database 428 is stored in the data storage 410. The executable instructions representing discovering candidate referential integrities in a database 106 (FIG. 1) are used to discover candidate referential integrities in the subject database 428. The executable instructions representing discovering candidate referential integrities in a database 106 may be part of a suite of processes to discover characteristics about the subject database 428, using, for example, techniques described in [6] and [7].

Figure 6:
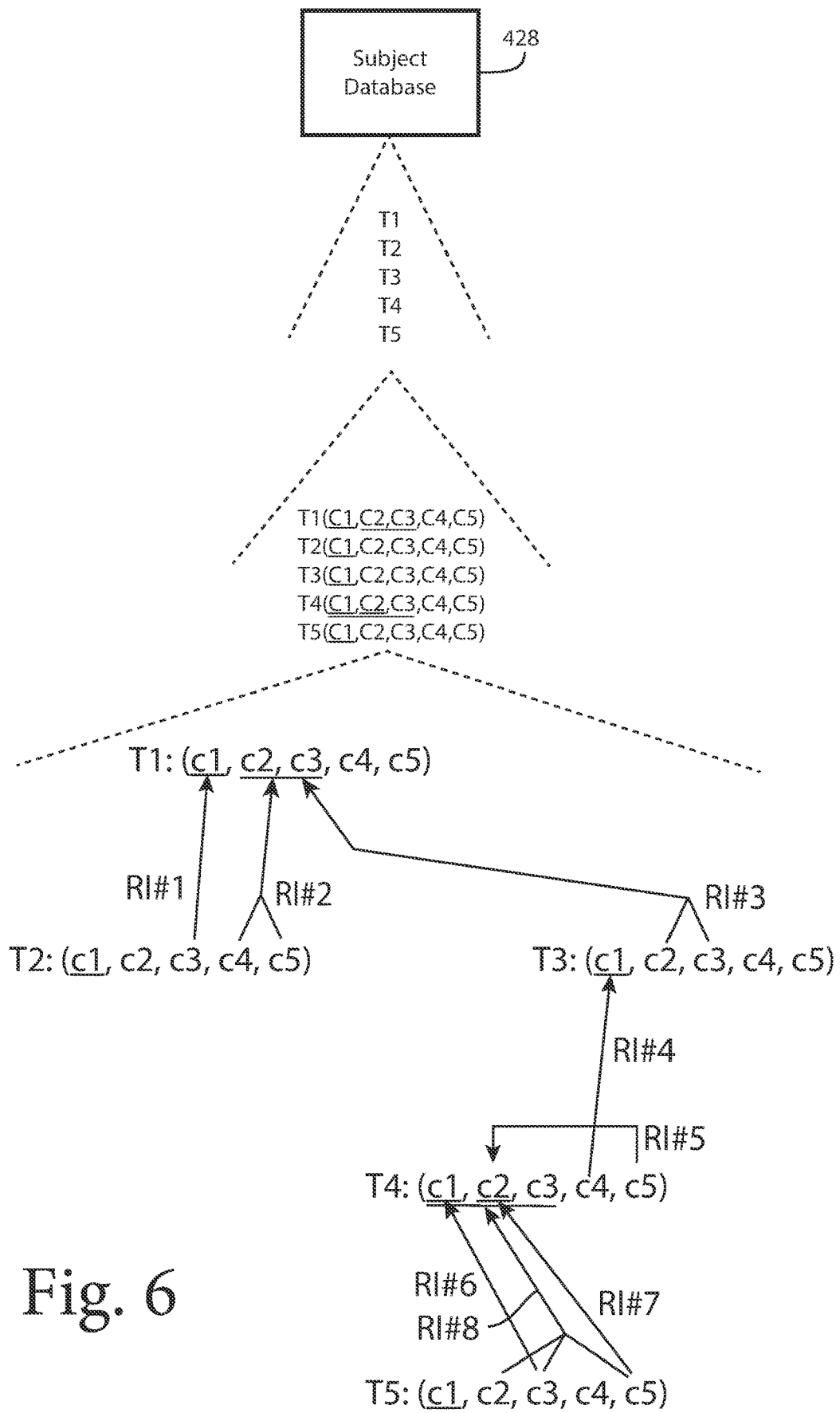
FIG. 6 illustrates the structure of the subject database.

FIG. 6 illustrates the structure of the subject database. The subject database 428 may include one or more relations, or tables. In FIG. 6, the subject database 428 has 5 tables: T1, T2, T3, T4, and T5. Each of the tables in the subject database 428 has 5 columns: c1, c2, c3, c4, and c5. Unique columns (i.e., columns having no repeated values) or unique groups of columns (i.e., groups of columns whose combined values have no repeated values) of each table are underlined. T1 has c1 as a unique column and (c2,c3) as a unique group of columns (note that (c2,c3) are underlined with a underlining symbol indicating a unique group of columns). Each of T2, T3 and T5 have c1 as a unique column while T4 has c1 and c2 as unique columns, and (c1,c2,c3) together as a unique group of columns (note that c1, c2, c3 are underlined together with an underlining symbol separate from the underlining symbols used to indicate the uniqueness of columns c1 and c2). Note that the number of tables, the number of columns per table, and the identification of unique columns and unique groups of columns are just examples and should not be interpreted as limiting the appended claims.

In addition, the subject database includes eight referential integrity constraints (again, the number of referential integrity constraints is merely an example and should not be interpreted as limiting the appended claims), indicated by lines with arrowheads (when the referenced columns or groups of columns are unique, the arrowhead touches the symbol indicating the uniqueness of the column or group of columns being referenced), where the notation of A←B is used to indicate that A is referenced by B, where A and B are a set of columns:

RI #1: Tc1.1←T2.c3, i.e., column c1 in table T1 is referenced by column c3 in table T2, RI #2: (T1.c2,T1.c3)←(T2.c4,T2.c5), i.e., columns c2 and c3 in table T1 are referenced by columns c4 and c5 in table T2, RI #3: (T1.c2,T1.c3)←(T3.c2,T3.c3), i.e., columns c2 and c3 in table T1 are referenced by columns c2 and c3 in table T3, RI #4: T3.c1←T4.c4, i.e., column c1 in table T3 is referenced by column c4 in table T4, RI #5: T4.c2←T4.c5, i.e., column c2 in table T4 is referenced by column c5 in table T4, RI #6: T4.c1←T5.c3, i.e., column c1 in table T4 is referenced by column c3 in table T5 (note that the arrowhead for RI #6 touches the underlining symbol for unique column T4.c1, bypassing the underlining symbol for unique group of columns (T4.c1,T4.c2,T4.c3)), RI #7: T4.c2←T5.c5, i.e., column c2 in table T4 is referenced by column c5 in table T5 (note that the arrowhead for RI #7 touches the underlining symbol for unique column T4.c2, bypassing the underlining symbol for unique group of columns (T4.c1,T4.c2,T4.c3)), RI #8: (T4.c1,T4.c2,T4.c3)←(T5.c2,T5.c3,T5.c5), i.e., columns c1, c2, and c3 in table T4 are referenced by columns c2, c3, and c5 in table T5 (note that the arrowhead for RI #8 touches the underlining symbol for unique group of columns (T4.c1,T4.c2,T4.c3)).

Referential integrity constraints with a single referenced column and a single referring column, such as RI #1, RI #4, RI #5, RI #6, and RI #7, will be referred to herein as single-column referential integrity constraints. Referential integrity constraints with more than one reference column and more than one referencing column will be referred to herein as n-column referential integrity constraints, where n is the number of referencing columns and the number of referenced columns. For example, RI #2 and RI #3 may be referred to as 2-column referential integrity constraints and RI #8 may be referred to as a 3-column referential integrity constraint. For the purposes of this application, the number of referenced columns equals the number of referencing columns.

Some of the structure illustrated in FIG. 6 may be known when the system 100 is presented with the subject database 428. In other circumstances, it may be necessary for the system to identify the tables, the columns within each table, the candidate referential integrities, and other parameters of the structure of the subject database 428. In other circumstances, some of the structure may be known. For example, the table structure, the column structure within each table, or some of the referential integrity constraints may be known. Of interest in the instant application, some or all of the referential integrity constraints may be hidden. This may be because the subject database was provided without any of this information or some or all of the referential integrity constraints may have been created by users without realizing that they were doing so. As such, they are missing out on the advantages that referential integrity constraints bring to maintaining databases and optimizing queries.

Figure 7:
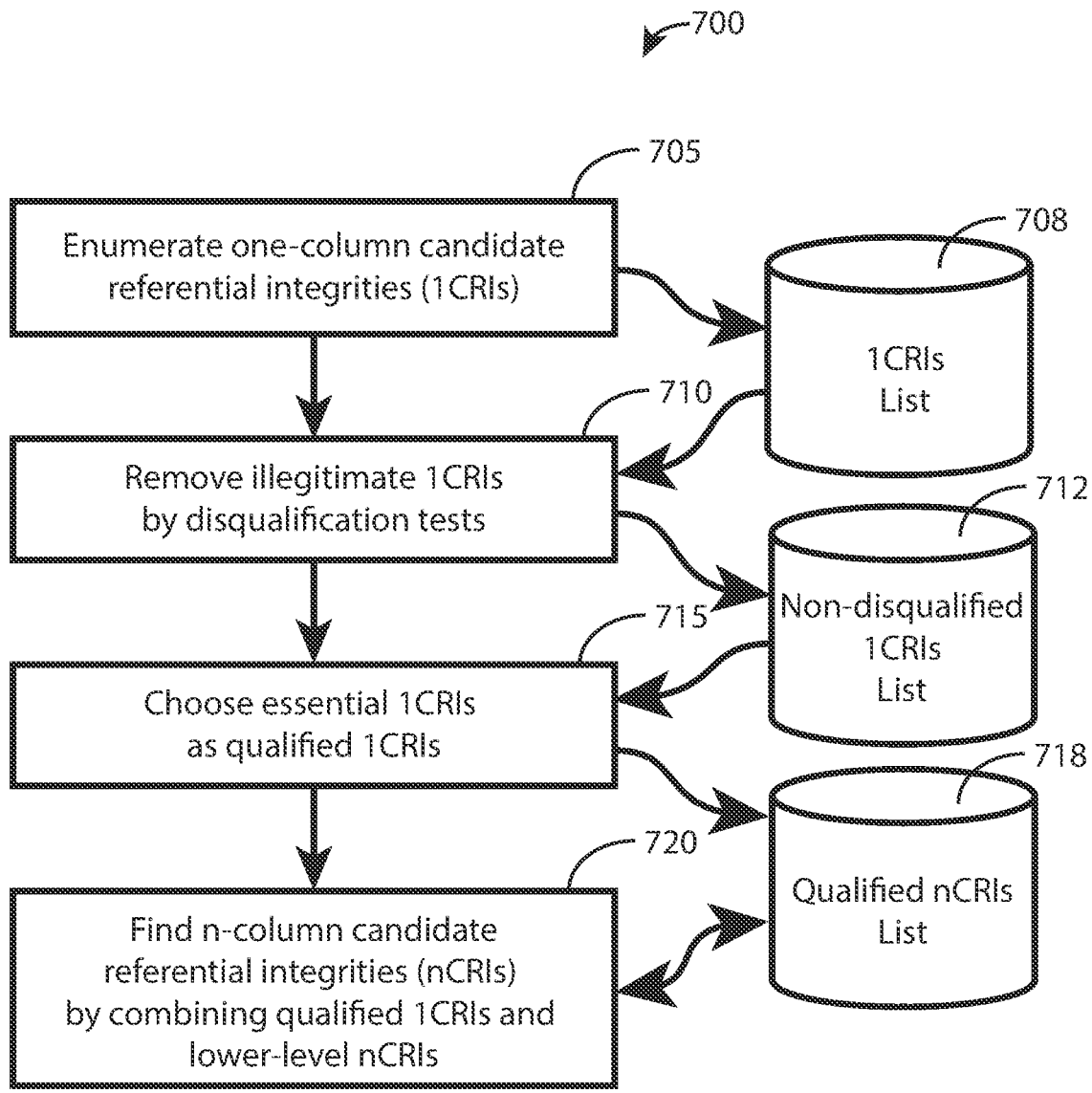
FIG. 7 illustrates a technique for discovering candidate referential integrities that may be selected by a user to be referential integrity constraints.

FIG. 7 illustrates a technique for discovering candidate referential integrities that may be selected by a user to be referential integrity constraints. That is, the techniques described herein are for discovering candidates for referential integrity constraints. Once again, the ultimate decision as to whether a candidate referential integrity is referential integrity constraint is left to the user. Candidate referential integrities include:

one-column candidate referential integrities, which are between a single referencing column and a single referenced column;

two-column candidate referential integrities, which are between two referencing columns and two referenced columns;

three-column candidate referential integrities, which are between three referencing columns and three referenced columns; and generally, n-column referential integrities, which are between n referencing columns and n referenced columns.

As an example of a two-column referential integrity constraint, consider two tables: Classroom and Class. A row in Classroom is uniquely identified by a combined value from BldNo and RoomNo. It is required that a combined value of BNo and RNo in the Class table must be present in a list of combined values of BldNo and RoomNo in the Classroom table. In this example, the BldNo and RoomNo columns of the Classroom table are the referenced columns and BNo and RNo in the Class table are the referencing columns.

As an example of a three-column referential integrity constraint, consider two tables: Class and BestClassVote. Class has at least a ClassId column that includes a unique identifier for each class that might receive a vote for best class. BestClassVote has at least the following three columns: vote1, vote2, and vote3, which hold three best classes chosen by individual students. In such a case, three referential integrity constraints are expected: Class.ClassId←BestClassVote.vote1, Class.ClassId←BestClassVote.vote2, Class.ClassId←BestClassVote.vote3. It is not common to think of one referential integrity constraint: ClassId←(vote1, vote2, vote3).

Thus, for the purposes of this application, the number of referenced columns will equal the number of referencing columns.

The technique 700 is to (1) enumerate one-column candidate referential integrities (hereinafter 1CRIs) 705 to create a 1CRIs list 708, (2) remove 1CRIs from the 1CRIs list 708 by disqualification tests 710 to produce a non-disqualified 1CRIs list 712, (3) choose essential 1CRIs from the non-disqualified 1CRIs list 712 as qualified 1CRIs 715 to produce a qualified 1CRIs list 718, and (4) find candidate n-column candidate referential integrities (hereinafter nCRIs) by combining the qualified 1CRIs and lower-level nCRIs 720 from the qualified pairs list 718.

Enumerating Candidate Pairs

Enumerating 1CRIs 705 may involve pairing each column as a referenced column with every other column as respective referencing columns. If there are x total columns in the database, then the number of candidate pairs would be x times x−1. In the example in FIG. 6, there are 25 columns, resulting in 25-24=600 1CRIs.

Removing Illegitimate Candidate Pairs Using Disqualification Tests

Removing illegitimate 1CRIs by disqualification tests 710 involves running 4 disqualification tests, some of which include sub-tests (showed indented below):

1. Domain Inclusion Test
    a. Data Type Domain Match Sub-Test
    b. Max-Values Sub-Test
    c. Min-Values Sub-Test
    d. Bloom-Filter Sub-Test
    e. Number of Unique Values Sub-Test
2. Surrogate Key Discordance Test
    a. Value Start-Distance Sub-Test
    b. End-Of-A-Spectrum Sub-Test
    c. Synthetic Key Similarity Sub-Test
3. Minimum Support Test
4. Minimum Coverage Test
    a. Using Cardinality Sub-Test
    b. Using Min-Hash Sub-Test.

The disqualification tests and sub-tests are discussed in more detail below. The disqualification tests are applied to a 1CRI being tested (hereinafter (A*,B*), where A* represents a set of values of referenced column or columns and B* represents a set of values of referencing column or columns), until (A*,B*) is disqualified or until all of the disqualification tests have been executed and (A*,B*) has not been disqualified, in which case (A*,B*) is added to the list of non-disqualified 1CRIs 712. The aim of each disqualification test is not to have a certain answer, i.e., that A* is referenced by B*. Each disqualification test has two results: "(A*,B*) is not valid" or "(A*,B*) may be valid." This is why multiple disqualification tests are run and why the final determination that A* is referenced by B* so that a candidate referential integrity can be inferred between the two columns is not made until all the disqualification tests have been run without disqualifying 1CRI.

Figure 8:
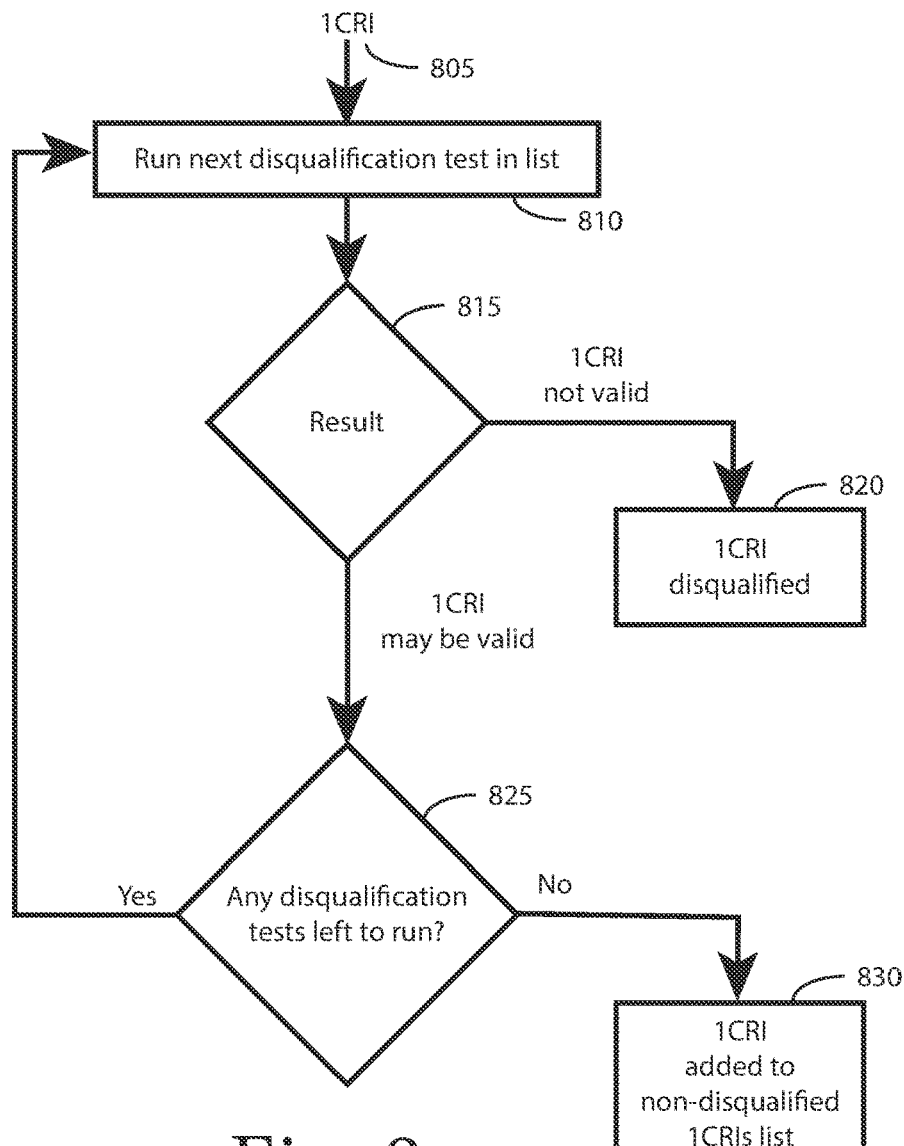
FIG. 8 illustrates the process of running disqualification tests.

FIG. 8 illustrates the process of running disqualification tests. A 1CRI 805 is provided; note that the process illustrated in FIG. 8 is run for each candidate pair in the 1CRIs list 708. The process enters a loop beginning with running the next disqualification test in the list of disqualification tests (block 810). The first time through the loop, this will be the first disqualification test in the list. The disqualification test will produce a result, which is tested (block 815). If the result is "1CRI not valid," the final result is that the candidate pair is disqualified (block 820). If the result is "1CRI may be valid," the process determines if there are any other disqualification tests to be run (block 825). If there are ("yes" prong from block 825), the loop returns to the beginning and runs the next disqualification test (block 810). If there are no further disqualification tests to be run ("no" prong from block 825), the 1CRI is added to the non-disqualified 1CRIs list (block 830).

Figure 9:
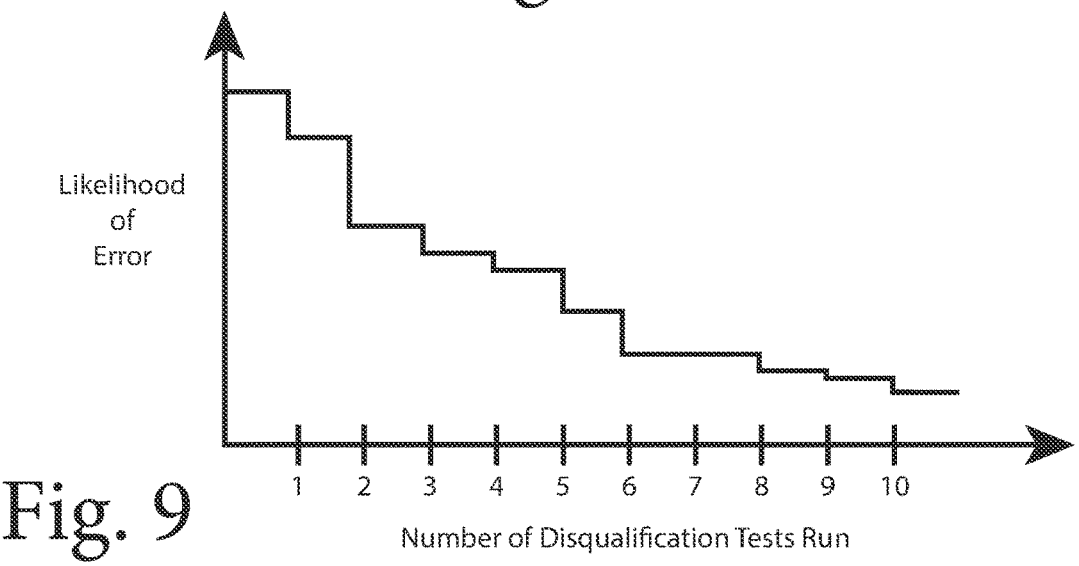
FIG. 9 illustrates the diminishing likelihood of incorrectly identifying a candidate referential integrity with each disqualification test run.

The likelihood of incorrectly identifying a relationship between a candidate pair decreases with each disqualification test, although the possibility of an incorrect identification may not be eliminated even after all of the disqualification tests have been run. FIG. 9 illustrates the diminishing likelihood of incorrectly identifying a relationship between a candidate pair with each disqualification test run. Note that the vertical scale in FIG. 9 is arbitrary, not necessarily linear, and merely intended as an illustration. The likelihood begins at a certain level before test 1 is run. The likelihood drops by different amounts as each test is run except test 7, which does not cause the likelihood to drop; the test is ineffective against the data being considered. Finally, after test 10, the likelihood has dropped to its lowest, but still non-zero, level.

The disqualification tests may be applied in the order listed above or they may be applied in a different order, as determined by the user, to provide the most efficient (or fastest, or some other measure) application of the disqualification tests. Users may discover that a particular order of disqualification tests is the most useful for the type of data they collect and use. Further, a user may find that one or more of the tests or sub-tests is not useful and may not include them in their processing.

The tests and sub-tests use two or more of the following statistics about (A*,B*):
- a data type of A*,
- a data type of B*,
- a number of unique values in A*($NUV_{A*}$),
- a number of unique values in B*($NUV_{B*}$),
- a number of unique values in the intersection of A* and B*($NUV_{A* \cap B*}$), calculated as discussed below,
- a MinHash(A*,B*) (denoted as MH(A*,B*)), which is a probabilistic representation of Jaccard similarity [9],
- an n greatest values in A*,
- an n greatest values in B*,
- an m smallest values in A*,
- an m smallest values in B*,
- a Bloom filter of A*($Bloom_{A*}$),
- a Bloom filter of B*($Bloom_{B*}$),
- a smallest value in A*,
- an average gap between consecutive values in A*, defined to be a sum of gaps between consecutive A* values divided by $NUV_{A*}-1$,
- a standard deviation of differences between consecutive values in A*,
- a cardinality of A*, and
- a cardinality of B*.

Some of the statistics listed above are collected routinely by database systems. Others, such as the n greatest values or m smallest values, may require minor modifications of existing statistics (e.g., greatest value and smallest value). Others, such as an approximate NUV or a Bloom filter, may have higher costs but still may require only a single pass through a data set. An exact NUV may be more costly, requiring more than a single pass through a data set, so the NUV statistics may be approximate NUVs.

1. Domain Inclusion Disqualification Test

The Domain Inclusion Disqualification Test checks if the domain of B* is inclusive to the domain of A*. If it is not, (A*,B*) can be disqualified. The Domain Inclusion Disqualification Test is made up of five sub-tests: the Data Type Domain Match Sub-Test, the Max-Values Sub-Test, the Min-Values Sub-Test, the Bloom-Filter Sub-Test, and the Number of Unique Values Sub-Test.

1a. Data Type Domain Match Sub-Test

The Data Type Domain Match Sub-Test disqualifies (A*, B*) if the data type of B* is larger than that of A*. For example, if the data type of B* is of bigint and the data type of A* is of int, then (A*,B*) is disqualified.

1b. Max-Values Sub-Test

Using the n greatest values in A* and the n greatest values in B*, this test disqualifies (A*,B*) if one of the n greatest values of B*: (1) is not found among the n greatest values in A,* and (2) is greater than the nth greatest value in A*. This technique determines if it is guaranteed that a value of B* is not among the values in A*.

FIG. 10 shows example cases to illustrate the Max-Values Sub-Test. Consider five example cases shown in FIG. 10, where n is 4 (i.e., the four greatest values of A* and B* are considered), "Tbl1.col1" represents a column "col1" of a table "Tbl1", and "Tbl2.col2" represents a column "col2" of a table "Tbl2". In these five example cases, "Tbl1.col1" corresponds to A* and "Tbl2.col2" corresponds to B*. Values of B* are in bold if the values are not shown in the four greatest values of A*.

In Example Case #1, (A*,B*) is disqualified because it satisfies both prongs of the test: the 4th value (i.e., 75) of B* is not in the four greatest values (i.e., {100, 90, 80, 70}) of A* and is greater than the 4th value (i.e., 70) of A*. Disqualification makes sense because it is guaranteed that the entire dataset of A* does not include the 4th greatest value 75 of B*.

Likewise, in Example Case #2, (A*,B*) is disqualified, because it is guaranteed that the entire dataset of A* does not include the 2nd greatest value (i.e., 85) of B*.

In Example Case #3, unlike Example Case #1 and Example Case #2, (A*,B*) is not disqualified, even though the 4th greatest value of B* (i.e., 65) is not in the four greatest values (i.e., {100, 90, 80, 70}) of A*, because the entire dataset of A* has a chance to have the value of 65.

Similarly, in Example Case #4, (A*,B*) is not disqualified even though the 3rd and the 4th greatest values of B* are missing in the four greatest values of A*, the entire dataset of A* still has a chance to have the values of 65 and 60.

In Example Case #5, (A*,B*) is disqualified due to the 2nd greatest value (i.e., 75) of B*. It is guaranteed that the value of 75 does not exist in the entire dataset of A*.

Note that the value of n cannot exceed the total number of unique values of A* and B*, respectively. In that case, the number of greatest values collected for A* and B* could be different. The technique is still effective for that case.

1.c Min-Values Sub-Test

Using the m smallest values of A* and the m smallest values of B*, the Min-Values Sub-Test disqualifies (A*,B*), if one of the m smallest values of B* (1) is not found in the m smallest values of A* and (2) is smaller than the mth smallest value of A*. As in the Max-Values Sub-Test, this Sub-Test determines if it is guaranteed that a value of B* is not among the values in A*.

FIG. 11 shows example cases to illustrate the Min-Values Sub-Test. In the five example cases shown in FIG. 11, m is 4, and other notations are the same as what were used in the Max-Values Sub-Test examples described above in connection with FIG. 10. The pairs of A* and B* are disqualified in Example Case #1, Example Case #2, and Example Case #5. The pairs of A* and B* are not disqualified in Example Case #3 and Example Case #4.

Note that when the total number of unique values of A* and B* are small, the m number of smallest values and the n number of greatest values could overlap conceptually, but those overlapping values do not need to be replicated physically for the use of these techniques.

1.d Bloom-Filter Sub-Test

The Bloom-Filter Sub-Test disqualifies (A*,B*) if a Bloom filter of A* is not a superset of a Bloom filter of B*. Bloom filters are described in detail at [8]. For the purposes of this application Bloom filters are defined as follows: values in A* and B* are mapped to values in a Bloom filter of A* and a Bloom filter of B*, respectively, by one or more hashing functions. The resulting Bloom filters may be as simple as a single bit set to "1" or "0" depending on whether one or more of the hashing functions map to that single bit. The resulting Bloom filters can be examined to determine if the Bloom filter of A* is a superset of the Bloom filter of B*. If not, the set of values in B* is not a subset of the set of values in A*, and (A*,B*) is disqualified. Otherwise, (A*, B*) is not disqualified.

1.e Number of Unique Values (NUV) Sub-Test

The Number of Unique Values (NUV) Sub-Test disqualifies (A*,B*) if the number of unique values of B* is greater than the number of unique values of A*. For example, if the number of unique values of A* is 50 and the number of unique values of B* is 100, (A*,B*) is disqualified because it is guaranteed that A* cannot cover all the values of B*.

2. Surrogate Key Discordance Disqualification Tests

The Surrogate Key Discordance Test disqualifies (A*,B*) if A* is likely to be a surrogate key. A surrogate key in a data set may be a unique identifier for each object in the data set but not be otherwise semantically related to the data in the data set. For example, a table may include one column of names and another column that uniquely numbers each name. In that case, the column with unique numbers is a surrogate key. Finding a surrogate key can be done with either or both of the below two metrics.

2.a Value Start-Distance Sub-Test

The Value Start-Distance Sub-Test helps to avoid the case that a surrogate key becomes the most frequently referenced key even though there is no semantic relationship between the surrogate key and an integer-type column. A surrogate key is modeled as a key whose values increases from s by w. For example, a surrogate key from 1 by 1 has a set of values like {1, 2, 3, 4, . . . } and a surrogate key from 6 by 2 has a set of values like {6, 8, 10, 12, . . . }. The likelihood of whether a candidate key is a surrogate key is modeled as a Surrogate Key Discordance (SKD) shown below.

Here is one possible metric for Surrogate Key Discordance (SKD):

$$SKD = MIN(CEIL(|MinVal - s| + |AvgGap - w| + StdGap), 1),$$

where

MinVal: the smallest value of a candidate key,

AvgGap: the average of value difference between two adjacent values,

StdGap: the standard deviation of value differences between two adjacent values, CEIL(value): a function to round up the value to the nearest integer greater than the value, MIN(lval,rval): a function to return the smallest value of the two values lval and rval,

|value|: an operator to return the magnitude of the value irrespective of its sign, s: the starting value for the surrogate key to be tested, and w: the interval for the surrogate key to be tested.

In the vast majority of cases, the effective values of s and w would be 1, respectively. The lowest possible value of SKD is 0, which is interpreted to mean that the column being evaluated is a surrogate key. The highest possible value of SKD is 1, which is interpreted to mean that the column being Filed electronically on: Nov. 24, 2023 evaluated is not a surrogate key. A threshold, SKD-threshold, between 1 and 0 may be used to judge columns that fall between being clearly surrogate keys and clearly not surrogate keys.

To calculate SKD, the values of MinVal, AvgGap, and StdGap are gathered from A* and plugged into the equation for SKD along with selected values of s and w. The resulting SKD is then compared to an SKD-threshold. If SKD is less than the SKD-threshold, A* is determined to be a surrogate key and (A*,B*) is disqualified. The sub-test may be run with various values of s and w. For example, s may be set to MinVal and w may be set to AvgGap, in which case the calculation of SKD reduces to the value of StdGap, if the value of StdGap is less than 1, or 1 if the value of StdGap is greater than 1.

2.b End-Of-A-Spectrum Sub-Test

The End-of-a-Spectrum Sub-Test is run against integer columns in a 1CRI. A* is regarded as a surrogate key if the m smallest values in A* are less than or equal to "sqrt $(NUV_{A*})$" and the m greatest values in A* are greater than "$NUV_{A*}$-sqrt $(NUV_{A*})$", m is less than or equal to sqrt $(NUV_{A*})$, and $NUV_{A*}$ is greater than 4.

This sub-test can be used without needing to sort the column being evaluated and can make a decision based on the beginning and the ending portions of the data domain of the column. The determination of m depends on the accuracy of NUV (if an approximate NUV is used) and tolerable gaps of individual values of a surrogate key.

For example, consider two columns: A1 and A2, where A1={1, 2, 3, 4, 5, 6, 7, 8, 9, 10, 11, 12, 13, 14, 15, 16}, and A2={2, 4, 6, 8, 10, 12, 14, 16, 18, 20, 22, 24, 26, 28, 30, 32}. Note that this sub-test does not require knowledge of all values of A1 and A2 but requires knowledge that the NUV of A1 and A2 are 16. If an average gap of 1 is considered to be a surrogate key, then m can be determined to be 4 (which is exactly the same as sqrt(16)). A1 is judged to be a surrogate key because the four smallest values 1, 2, 3, and 4 are less than or equal to 4=sqrt(16), and the four greatest values 13, 14, 15, and 16 are greater than 12=16−sqrt(16)). In contrast, A2 is not judged as a surrogate key. In evaluating A2, an average gap of 1 or 2 is considered to be a surrogate key, and m can be decreased from 4 to 2. The two smallest values in A2, 2 and 4, are less than or equal to 4=sqrt(16) and the two greatest values in A2, 30 and 32, are greater than 12=16−sqrt(16), and A2 is determined not to be a surrogate key.

2.c Synthetic Key Similarity Sub-Test

The Synthetic Key Similarity Sub-Test disqualifies (A*, B*) if the similarity of A* and C* is greater than a key-similarity-threshold, where C* is a set of possible surrogate key values. C* can be synthesized by popular surrogate key values. For example, for integers, C* can be [0, . . . , 20], [0, . . . , 100], [0, . . . , 500], or [0, . . . , 1000]. It is also possible to synthesize and use multiple C*, like C1*=[0, . . . , 20], C2*=[0, . . . , 100], C3*=[0, . . . , 500], and so on. In such a case, (A*,B*) is disqualified if the similarity between A* and any C* is greater than the key-similarity-threshold. The similarity between A* and C* can be computed by the MinHash method.

3. Minimum Support Disqualification Test.

The Minimum Support Test disqualifies (A*,B*) if the cardinality of B* is smaller than a minimum-support-threshold. This test helps to avoid the case when columns of a small table are recognized as foreign keys inappropriately.

4. Minimum Coverage Disqualification Test

The Minimum Coverage Disqualification Test disqualifies (A*,B*) if $NUV_{A* \cap B*}/NUV_{A*}$ is less than a minimum-coverage-threshold, where, as discussed above, $NUV_{A*}$ is the number of unique values of A* and $NUV_{A* \cap B*}$ is the number of common unique values between A* and B*. If $NUV_{A* \cap B*}$ and $NUV_{A*}$ are available, $NUV_{A* \cap B*}/NUV_{A*}$ is computed and a comparison is made to the minimum-coverage-threshold. The Using Cardinality Sub-Test and the Using MinHash Sub-Test may be used without $NUV_{A* \cap B*}$. These techniques help avoid the case that a key with large-domain is considered as being the most referenced key by semantically-irrelevant columns.

4.a Using Cardinality Sub-Test

The Using Cardinality Sub-Test disqualifies (A*,B*) if at least a cardinality-threshold of the domain of A* is not covered by the domain of B*. In other words, (A*,B*) is qualified when the intersection of the values of A* and the values of B* is close to the values of B*. The coverage is tested by NUV and/or Bloom-filter of A* and B*, instead of using actual column values, which is time-consuming. The NUV-based coverage is modeled as $NUV_{B*}/NUV_{A*}$, where $NUV_{A*}$ is the number of unique values of A* and $NUV_{B*}$ is the unique number of values of B*. The Bloom-filter based coverage is modeled as CARD ($Bloom_{A*} \cap Bloom_{B*}$)/CARD ($Bloom_{A*}$), where $Bloom_{A*}$ and $Bloom_{B*}$ represent Bloom filters of A* and B*, respectively, n represents a bitwise AND operation between two Bloom filters, and CARD is a function computing the number of bits that are set to 1.

4.b Using MinHash Sub-Test

In the MinHash Sub-Test, (A*,B*) is disqualified if:

$(MH(A*,B*) \cdot (NUV_{A*}+NUV_{B*})/(MH(A*,B*)+1))/NUV_{A*}$ is less than a min-hash-threshold, where:
MH(A*,B*), which is an abbreviation for MinHash(A*, B*), is a statistic that is sometimes available from database systems.

Choosing Essential Candidate Pair Using a Qualification Test

The qualification test 715 chooses a certain number of outstanding 1CRIs from non-disqualified 1CRIs list 712 to produce the qualified nCRIs list 718 (which will include qualified nCRIs of higher order than 1CRIs, as discussed below). The measure of whether a 1CRI is "outstanding" is determined by the frequency that the referenced side, i.e., A* in (A*,B*), is referenced among the non-disqualified 1CRIs 712 (i.e., how often the left-hand side of a 1CRI is seen among the non-disqualified 1CRIs). That is, 1CRIs whose referenced side are referenced more often than a qualification-number-threshold are qualified. The chosen 1CRIs are called qualified 1CRIs.

Searching for nCRIs nCRIs are formed by combining lower level nCRIs. Searching for nCRIs involves combining qualified (n−1) CRIs and 1CRIs (720). For example, to find 2CRIs a qualified 1CRI is combined with another qualified 1CRI. To find 3CRIs, a 2CRI is combined with a qualified 1CRI. To find a 4CRI, a 3CRI is combined with a qualified 1CRI. Note that it is not necessary to consider the combination of two 2CRIs for a 4CRI, because such 4CRIs are covered by the combination of a 3CRI and a qualified 1CRI.

Figure 12:
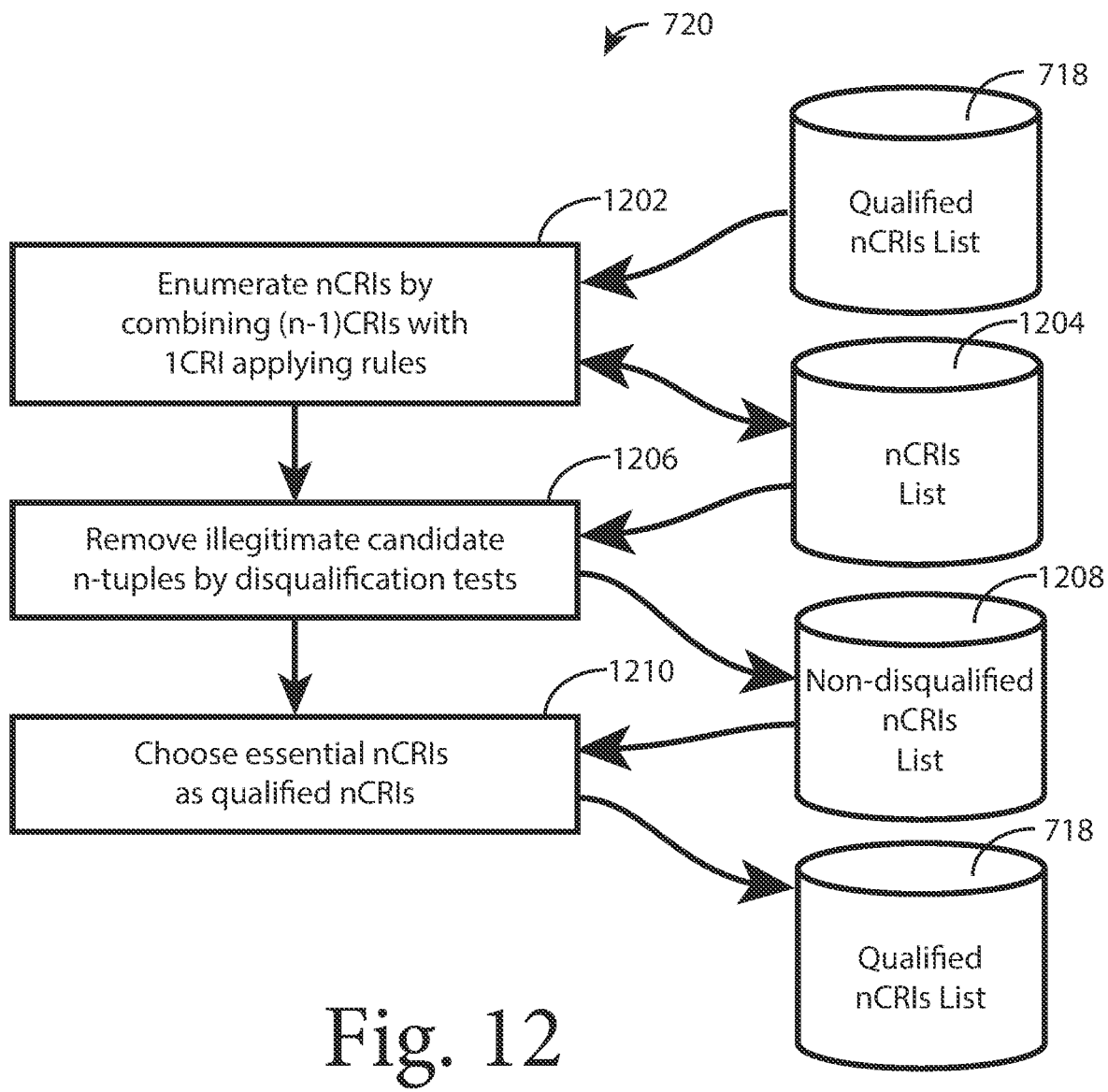
FIG. 12 illustrates the process of searching for n-column candidate referential integrities (nCRIs).

FIG. 12 illustrates the process of searching for nCRIs. The process of searching for nCRIs follows the three steps below:

1. Enumerate nCRIs by combining a qualified (n−1)CRI with a qualified 1CRI from the qualified nCRIs list 718 (1202), to produce a nCRIs list 1204. Note that for a 2CRI, two qualified 1CRIs are combined. The following three reduction rules are applied when enumerating nCRIs, which avoid enumerating trivial/illegitimate candidates:

Rule #1: the referenced columns should be different but belong to the same table.

Rule #2: the referencing columns should be different but belong to the same table.

Rule #3: the referenced columns and the referencing columns should be disjoint (i.e., no common columns between the two).

2. Perform the disqualification tests described above on the nCRIs to remove illegitimate nCRIs (1206) to produce a non-disqualified nCRIs list 1208. For the disqualification tests, statistics on the combined values of the n columns of the left-hand side and other statistics on the combined values of the n columns of the right-hand side are used, if statistics are used. Otherwise, actual values of the left-hand side table and the right-hand side table can be sampled for disqualification. The sample size can be determined accordingly based on the knowledge of the underlying dataset.

3. Perform the qualification test described above against the non-disqualified nCRIs 1208 to produce qualified nCRIs to add to the qualified nCRIs list 718 (note that, for clarity, the qualified nCRIs list 718 is shown twice in FIG. 12).

FIG. 13 illustrates algorithmically the process of forming nCRIs. The definition of nCRIs requires that all referenced columns should belong to the same table and all the referencing columns should belong to the same table. Therefore, the combination of two nCRIs will be skipped and not considered in forming nCRIs if: the referenced columns do not belong to the same table (line 10), OR the referencing columns do not belong to the same table (line 11). Furthermore, nCRIs are not formed from 1CRIs in which one or more columns appear in both the referenced and referencing sides (line 12). If the nCRIs have already been discovered, it is not necessary to apply the tests (line 13). Note that when comparing two nCRIs, the order of columns in both the referencing and referenced sides does not matter as long as the columns from the same 1CRI are in the same position. For example, (ai,aj)←(bi,bj) is identical to (aj,ai)←(bj,bi).

Example

Figure 14:
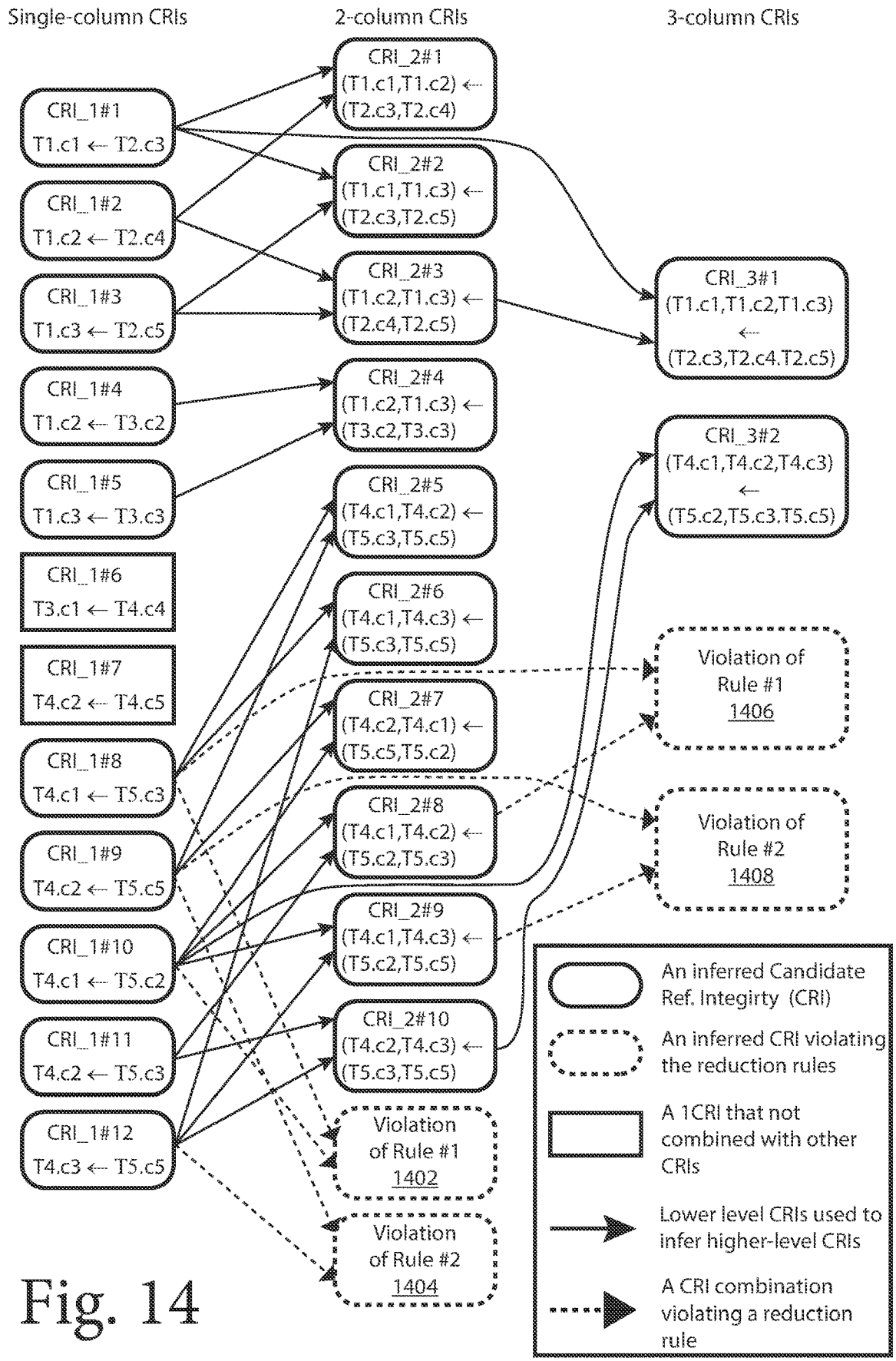
FIG. 14 illustrates an example of discovery of nCRIs.

FIG. 14 illustrates an example of discovery of candidate referential integrities. The example uses the database illustrated in FIG. 6. Note that FIG. 6 shows the actual referential integrity constraints. The process described below assumes no knowledge of the referential integrity constraints. Only the tables and the columns within the tables are known.

The first step is to enumerate the single-column candidate referential integrities. As an example, assume the desire is to consider all the combinations of every column. As there are 25 columns (5 tables, each having 5 columns) in the example database shown in FIG. 6, there are 25−24=600 candidate pairs (each of the 25 columns in the database paired with all of the other 24 columns). The disqualification tests and sub-tests described above and the qualification test described above for each pair are applied to the 600 candidate pairs, resulting in the discovery of 12 qualified single-column CRIs (1CRIs). They are listed under the "Single-column CRIs" column in FIG. 14. FIG. 14 uses CRI_N #M to refer to candidate referential integrities inferred as described above, where N is n-column CRIs, N is 2 for 2CRIs, N is 3 for 3CRIs, and so on; and M is a number to designate the particular CRI.

Note that:

CRI_1 #1 corresponds to RI #1 in FIG. 6,

CRI_1 #6 corresponds to RI #4 in FIG. 6,

CRI_1 #7 corresponds to RI #5 in FIG. 6,

CRI_1 #8 corresponds to RI #6 in FIG. 6, and

CRI_1 #9 corresponds to RI #7 in FIG. 6.

The remaining single-column CRIs do not correspond to actual referential integrity constraints in the subject database 428. Some of them will be used in discovering higher-order CRIs.

The next step is to discover 2CRIs by combining the 1CRIs. Note that (CRI_1 #6) and CRI_1 #7), which have square-edged rectangular shapes in FIG. 14, do not contribute to finding multi-column CRIs Filed electronically on: Nov. 24, 2023 because, for example, all of their combinations with other qualified 1CRIs are not considered further as a result of application of one of the 3 reduction rules.

Since twelve 1CRIs have been identified, there are 66 combinations (calculated as 12 taken 2 at a time since the order of columns in a pair does not matter). Applying the 3 reduction rules discussed above, we can infer 10 two-column CRIs with a reduction of approximately 85% of the search space (from 66 2CRIs to 10 2CRIs).

The inferred 2CRIs are shown in the middle column, labeled "2-column CRIs," in FIG. 14. As can be seen:
CRI_2 #1 is a combination of CRI_1 #1 and CRI_1 #2,
CRI_2 #2 is a combination of CRI 1 #1 and CRI 1 #3,
CRI_2 #3 is a combination of CRI_1 #2 and CRI_1 #3,
CRI_2 #4 is a combination of CRI_1 #4 and CRI_1 #5,
CRI 2 #5 is a combination of CRI 1 #8 and CRI 1 #9,
CRI_2 #6 is a combination of CRI_1 #8 and CRI_1 #12,
CRI_2 #7 is a combination of CRI_1 #9 and CRI_1 #10,
CRI 2 #8 is a combination of CRI 1 #10 and CRI 1 #11,
CRI_2 #9 is a combination of CRI_1 #10 and CRI_1 #12, and
CRI_2 #10 is a combination of CRI_1 #11 and CRI_1 #12.

Note that:
CRI_2 #3 corresponds to RI #2 in FIG. 6, and
CRI_2 #4 corresponds to RI #3 in FIG. 6, and
The remaining 2-column CRIs do not correspond to actual referential integrity constraints in the subject database 428. Some of them will be used in discovering higher-order CRIs.

Note that the reduction rules disqualified a few of the two-column CRIs; two examples are shown in FIG. 14 having dotted rounded-corner-rectangular shapes connected with dotted arrows with the participating single-column CRIs. Disqualified combination 1402, which is a combination of CRI_1 #8 and CRI_1 #10, is disqualified under Rule #1 because the referenced column (T4.c1) is the same in both CRI_1 #8 and CRI_1 #10. Disqualified combination 1404, which is a combination of CRI_1 #9 and CRI_1 #12, is disqualified under Rule #2 because the referencing column (T5.c5) is the same in both CRI_1 #9 and CRI_1 #12.

The three-column CRIs are then derived using the inferred 12 single-column CRIs (CRI_1 #1 ... RI_1 #12) and the 10 two-column CRIs (CRI_2 #1 ... CRI_2 #10). All 120 combinations (each of the 12 single-column CRIs with each of the 10 two-column CRIs) are examined. Applying the reduction rules, only 2 combinations survive resulting in a 98% reduction of the search space. The inferred three-column CRIs are shown in the far-right column of FIG. 14. As can be seen:
CRI 3 #1 is a combination of CRI 2 #3 and CRI 1 #1, and
CRI_3 #2 is a combination of CRI_2 #10 and CRI_1 #10.

Note that the reduction rules disqualified many of the three-column CRIs. Two examples of disqualified 3CRIs 1406 and 1408 are shown in FIG. 14. Disqualified combination 1406, which is a combination of CRI_2 #8 and CRI_1 #8, is disqualified under Rule #1 because CRI_2 #8 and CRI_1 #8 share a referenced column (T4.c1). Disqualified combination 1408, which is a combination of CRI_2 #9 and CRI_1 #9, is disqualified under Rule #2 because CRI_2 #9 and CRI_1 #9 share a referencing column (T5.c5).

In addition, some 3CRIs that have already been inferred are ignored. For example, there is no need to combine CRI_1 #2 with CRI_2 #2 because their pairing result CRI_3 #1 is already inferred by combining CRI_1 #1 with CRI_2 #3.

Note that CRI_3 #2 corresponds to RI #8 in FIG. 6. CRI_3 #1 does not correspond to an actual referential integrity constraint in the subject database 428. It may, however, be used in discovering higher-order CRI.

Finally, examining 4-column and 5-column CRIs, no eligible CRIs can be inferred and the algorithm is exited with the list of eligible CRIs.

The nCRIs are provided to a user to decide whether to designate some or all of them as referential integrity constraints.

Further examples consistent with the present teaching are set out in the following numbered clauses.

Clause 1. A method comprising:
executing a plurality of processes on a plurality of compute groups,
wherein each compute group comprises one or more compute clusters,
wherein each compute cluster comprises one or more nodes,
wherein each node comprises at least one computer processor and a memory,
wherein the plurality of processes store data on a data storage;
a database system executing as at least one of the plurality of processes;
the database system configured to issue executable steps to at least one of the processes executing as part of the database system,
the database system receiving a database comprising one or more relations comprising a plurality of input columns;
the database system enumerating one-column candidate referential integrities (1CRIs) from the plurality of input columns in the one or more relations, wherein each 1CRI includes a referenced column (A) having a plurality of referenced-column values and a referencing column (B) having a plurality of referencing column values;
the database system applying one or more disqualification tests to the 1CRIs to eliminate illegitimate 1CRIs resulting in a list of non-disqualified 1CRIs, wherein the disqualification tests are applied to an 1CRI being tested (hereinafter (A*,B*), A* representing a set of values of a referenced column or columns and B* representing a set of values of a referencing column or columns) until (A*,B*) is disqualified or until all of the disqualification tests have been executed and (A*,B*) has not been disqualified, in which case (A*,B*) is added to the list of non-disqualified 1CRIs, wherein each of the disqualification tests reduces the likelihood of incorrectly adding (A*,B*) to the list of non-disqualified 1CRIs;
the database system applying a qualifying test to the non-disqualified 1CRIs resulting in a list of qualified 1CRIs;
the database system defining a referential integrity constraint between the referenced column and the referencing column of one of the qualified 1CRIs that is confirmed by a user to be a referential integrity constraint; and
the database system using the referential integrity constraint to optimize execution of a query received by the database system.

Clause 2. The method of clause 1 further comprising the database system rejecting an action regarding the database that violates the referential integrity constraint.

Clause 3. The method of any of the preceding clauses wherein the qualifying test identifies a non-disqualified 1CRI as a qualified 1CRI if more than a qualification-number-threshold number of referenced-column values in the non-disqualified pair are included in the referencing-column values.

Clause 4. The method of any of the preceding clauses wherein enumerating the 1CRIs includes iteratively pairing each of the plurality of input columns with every other of the plurality of input column.

Clause 5. The method of any of the preceding clauses wherein the disqualification tests include a domain inclusion disqualification test, that includes one or more of the following sub-tests:
- (a1) data type domain match sub-test, in which $(A^*,B^*)$ is disqualified if a data type of $B^*$ is larger than a data type of $A^*$,
- (a2) max-values sub-test, in which $(A^*,B^*)$ is disqualified if:
  - one of an n greatest values of $B^*$ is not among an n greatest values of $A^*$, and
  - one of the n greatest values of $B^*$ is greater than an nth greatest value of $A^*$,
- (a3) min-values sub-test, in which $(A^*,B^*)$ is disqualified if:
  - one of an m smallest values of $B^*$ is not among an m smallest values of $A^*$, and
  - one of the m smallest values of $B^*$ is smaller than an mth smallest value of $A^*$,
- (a4) Bloom-filter sub-test, in which $(A^*,B^*)$ is disqualified if a Bloom filter of $A^*$ is not a superset of a Bloom filter of $B^*$, and
- (a5) number of unique values sub-test, in which $(A^*,B^*)$ is disqualified if a number of unique values of $B^*$ is greater than a number of unique values of $A^*$.

Clause 6. The method of any of the preceding clauses wherein the disqualification tests include a surrogate key discordance test for $A^*$ that includes one or more of the following sub-tests:
- (b1) value start-distance sub-test, in which $(A^*,B^*)$ is disqualified if:
  - a smallest value in $A^*$, an average gap between values in $A^*$, and a standard deviation of value differences between consecutive values in $A^*$ indicate that $A^*$ is a surrogate key,
- (b2) end-of-a-spectrum sub-test, in which $(A^*,B^*)$ is disqualified if:
  - an m smallest values in $A^* <=$ a square root of a number of unique values in $A^*$ ($NUV_{A^*}$) and
  - an m greatest values in $A^* > NUV_{A^*}$ – the square root of $NUV_{A^*}$,
  - where $m <=$ the square root of $NUV_{A^*}$ and $NUV_{A^*} > 4$, and
- (b3) synthetic key similarity sub-test, in which $(A^*,B^*)$ is disqualified if:
  - a similarity of $A^*$ and $C^*$ is greater than a key-similarity-threshold,
  - where $C^*$ is a set of possible surrogate key values.

Clause 7. The method of any of the preceding clauses wherein the disqualification tests include a minimum support test, in which $(A^*,B^*)$ is disqualified if a cardinality of $B^*$ is less than a minimum-support threshold.

Clause 8. The method of any of the preceding clauses wherein the disqualification tests include a minimum coverage disqualification test, that includes one or more of the following sub-tests:
- (d1) using cardinality sub-test, in which $(A^*,B^*)$ is disqualified if:
  - $NUV_{B^*}/NUV_{A^*} >$ a domain-coverage threshold, where $NUV_{B^*}$ is a number of unique values in $B^*$ and $NUV_{A^*}$ is a number of unique values in $A^*$, and
  - $CARD(Bloom_{A^*} \cap Bloom_{B^*})/CARD(Bloom_{A^*})$, where $\cap$ represents a bitwise AND, CARD is a function having an argument that computes the number of bits in the argument that are set to 1, $Bloom_{A^*}$ is a Bloom filter of $A^*$, and $Bloom_{B^*}$ is a Bloom filter of $B^*$, and
- (d2) using Min Hash sub-test, in which in which $(A^*,B^*)$ is disqualified if $(MH(A^*,B^*) \cdot (NUV_{A^*} - NUV_{B^*})/(MH(A^*,B^*)+1))/NUV_{A^*}$ is less than a min-hash threshold, where $MH(A^*,B^*)$ is a statistic available from the database system.

Clause 9. The method of any of the preceding clauses further comprising identifying n-column referential integrities (nCRIs) by:
- the database system enumerating nCRIs among n–1 column CRIs to produce nCRIs, each nCRI having referenced columns and referencing columns; and
- the database system applying one or more reduction rules to the nCRIs to eliminate illegitimate nCRIs resulting in a reduced set of nCRIs, wherein the reduction rules are applied to a nCRI under consideration (nCRIUC) until the nCRIUC fails a reduction rules and is found to be illegitimate or until all the reduction rules have been run against the nCRIUC without finding the nCRIUC to be illegitimate, in which case the nCRIUC is added to the reduced set of nCRIs, wherein the reduction rules include:
  - (a) an nCRIUC is found to be illegitimate if referenced columns in the nCRIUC are not different columns or if they do not belong to a same relation,
  - (b) an nCRIUC is found to be illegitimate if referencing columns in the nCRIUC are not different columns or if they do not belong to a same relation,
  - (c) an nCRIUC is found to be illegitimate if referenced columns in the nCRIUC and referencing columns in the nCRIUC include one or more common columns,
- the database system applying the disqualification tests to the reduced set of nCRIs to produce nth-level non-disqualified nCRIs.

Clause 10. The method of any of the preceding clauses wherein the one or more disqualification tests uses two or more of the following statistics about $(A^*,B^*)$:
- a data type of $A^*$,
- a data type of $B^*$,
- a number of unique values in $A^*$ ($NUV_{A^*}$),
- a number of unique values in $B^*$ ($NUV_{B^*}$),
- a number of unique values in the intersection of $A^*$ and $B^*$ ($NUV_{A^* \cap B^*}$),
- a MinHash($A^*,B^*$) (abbreviated MH($A^*,B^*$)),
- an n greatest values in $A^*$,
- an n greatest values in $B^*$,
- an m smallest values in $A^*$,
- an m smallest values in $B^*$,
- a Bloom filter of $A^*$ ($Bloom_{A^*}$),
- a Bloom filter of $B^*$ ($Bloom_{B^*}$),
- a smallest value in $A^*$,
- an average gap between consecutive values in $A^*$, defined to be a sum of gaps between consecutive $A^*$ values divided by $NUV_{A^*} - 1$,
- a standard deviation of differences between consecutive values in $A^*$,
- a cardinality of $A^*$, and
- a cardinality of $B^*$.

Clause 11. A non-transitory computer-readable tangible medium, on which is recorded a computer program, the computer program comprising executable instructions, that, when executed, perform a method comprising:

executing a plurality of processes on a plurality of compute groups,
        wherein each compute group comprises one or more compute clusters,
        wherein each compute cluster comprises one or more nodes,
        wherein each node comprises at least one computer processor and a memory,
        wherein the plurality of processes store data on a data storage;
    a database system executing as at least one of the plurality of processes;
    the database system configured to issue executable steps to at least one of the processes executing as part of the database system,
    the database system receiving a database comprising one or more relations comprising a plurality of input columns;
    the database system enumerating one-column candidate referential integrities (1CRIs) from the plurality of input columns in the one or more relations, wherein each 1CRI includes a referenced column (A) having a plurality of referenced-column values and a referencing column (B) having a plurality of referencing column values;
    the database system applying one or more disqualification tests to the 1CRIs to eliminate illegitimate 1CRIs resulting in a list of non-disqualified 1CRIs, wherein the disqualification tests are applied to an 1CRI being tested (hereinafter (A*,B*), A* representing a set of values of a referenced column or columns and B* representing a set of values of a referencing column or columns) until (A*,B*) is disqualified or until all of the disqualification tests have been executed and (A*,B*) has not been disqualified, in which case (A*,B*) is added to the list of non-disqualified 1CRIs, wherein each of the disqualification tests reduces the likelihood of incorrectly adding (A*,B*) to the list of non-disqualified 1CRIs;
    the database system applying a qualifying test to the non-disqualified 1CRIs resulting in a list of qualified 1CRIs;
    the database system defining a referential integrity constraint between the referenced column and the referencing column of one of the qualified 1CRIs that is confirmed by a user to be a referential integrity constraint; and
    the database system using the referential integrity constraint to optimize execution of a query received by the database system.

Clause 12. The method of clause 11 further comprising the database system rejecting an action regarding the database that violates the referential integrity constraint.

Clause 13. The method of any of clauses 11-12 wherein the qualifying test identifies a non-disqualified 1CRI as a qualified 1CRI if more than a qualification-number-threshold number of referenced-column values in the non-disqualified pair are included in the referencing-column values.

Clause 14. The method of any of clauses 11-13 wherein enumerating the 1CRIs includes iteratively pairing each of the plurality of input columns with every other of the plurality of input column.

Clause 15. The method of any of clauses 11-14 wherein the disqualification tests include a domain inclusion disqualification test, that includes one or more of the following sub-tests:
    (a1) data type domain match sub-test, in which (A*,B*) is disqualified if a data type of B* is larger than a data type of A*,
    (a2) max-values sub-test, in which (A*,B*) is disqualified if:
        one of an n greatest values of B* is not among an n greatest values of A*, and one of the n greatest values of B* is greater than an nth greatest value of A*,
    (a3) min-values sub-test, in which (A*,B*) is disqualified if:
        one of an m smallest values of B* is not among an m smallest values of A*, and
        one of the m smallest values of B* is smaller than an mth smallest value of A*,
    (a4) Bloom-filter sub-test, in which (A*,B*) is disqualified if a Bloom filter of A* is not a superset of a Bloom filter of B*, and
    (a5) number of unique values sub-test, in which (A*,B*) is disqualified if a number of unique values of B* is greater than a number of unique values of A*.

Clause 16. The method of any of clauses 11-15 wherein the disqualification tests include a surrogate key discordance test for A* that includes one or more of the following sub-tests:
    (b1) value start-distance sub-test, in which (A*,B*) is disqualified if:
        a smallest value in A*, an average gap between values in A*, and a standard deviation of value differences between consecutive values in A* indicate that A* is a surrogate key,
    (b2) end-of-a-spectrum sub-test, in which (A*,B*) is disqualified if:
        an m smallest values in A*<=a square root of a number of unique values in A* ($NUV_{A*}$) and
        an m greatest values in A*>$NUV_{A*}$–the square root of $NUV_{A*}$,
        where m<=the square root of $NUV_{A*}$ and $NUV_{A*}$>4, and
    (b3) synthetic key similarity sub-test, in which (A*,B*) is disqualified if:
        a similarity of A* and C* is greater than a key-similarity-threshold, where C* is a set of possible surrogate key values.

Clause 17. The method of any of clauses 11-16 wherein the disqualification tests include a minimum support test, in which (A*,B*) is disqualified if a cardinality of B* is less than a minimum-support threshold.

Clause 18. The method of any of clauses 11-17 wherein the disqualification tests include a minimum coverage disqualification test, that includes one or more of the following sub-tests:
    (d1) using cardinality sub-test, in which (A*,B*) is disqualified if:
        $NUV_{B*}/NUV_{A*}$> a domain-coverage threshold, where $NUV_{B*}$ is a number of unique values in B* and $NUV_{A*}$ is a number of unique values in A*, and
    CARD($Bloom_{A*} \cap Bloom_{B*}$)/CARD($Bloom_{A*}$), where $\cap$ represents a bitwise AND, CARD is a function having an argument that computes the number of bits in the argument that are set to 1, $Bloom_{A*}$ is a Bloom filter of A*, and $Bloom_{B*}$ is a Bloom filter of B*, and (d2) using Min Hash sub-test, in which in which (A*,B*) is disqualified if $(MH(A^*,B^*) \cdot (NUV_{A^*} - NUV_{B^*})/(MH(A^*,B^*)+1))/NUV_{A^*}$ is less than a min-hash threshold, where MH(A*,B*) is a statistic available from the database system.

Clause 19. The method of any of clauses 11-18 further comprising identifying n-column referential integrities (nCRIs) by:
the database system enumerating nCRIs among n−1 column CRIs to produce nCRIs, each nCRI having referenced columns and referencing columns; and
the database system applying one or more reduction rules to the nCRIs to eliminate illegitimate nCRIs resulting in a reduced set of nCRIs, wherein the reduction rules are applied to a nCRI under consideration (nCRIUC) until the nCRIUC fails a reduction rules and is found to be illegitimate or until all the reduction rules have been run against the nCRIUC without finding the nCRIUC to be illegitimate, in which case the nCRIUC is added to the reduced set of nCRIs, wherein the reduction rules include:
  (a) an nCRIUC is found to be illegitimate if referenced columns in the nCRIUC are not different columns or if they do not belong to a same relation,
  (b) an nCRIUC is found to be illegitimate if referencing columns in the nCRIUC are not different columns or if they do not belong to a same relation,
  (c) an nCRIUC is found to be illegitimate if referenced columns in the nCRIUC and referencing columns in the nCRIUC include one or more common columns,
the database system applying the disqualification tests to the reduced set of nCRIs to produce nth-level non-disqualified nCRIs.

Clause 20. An article of manufacture comprising:
a system executing a plurality of processes on a plurality of compute groups,
  wherein each compute group comprises one or more compute clusters,
  wherein each compute cluster comprises one or more nodes,
  wherein each node comprises at least one computer processor and a memory,
  wherein the plurality of processes store data on a data storage;
a database system executing as at least one of the plurality of processes
the database system configured to issue executable steps to at least one of the processes executing as part of the database system,
the database system receiving a database comprising one or more relations comprising a plurality of input columns;
the database system enumerating one-column candidate referential integrities (1CRIs) from the plurality of input columns in the one or more relations, wherein each 1CRI includes a referenced column (A) having a plurality of referenced-column values and a referencing column (B) having a plurality of referencing column values;
the database system applying one or more disqualification tests to the 1CRIs to eliminate illegitimate 1CRIs resulting in a list of non-disqualified 1CRIs, wherein the disqualification tests are applied to an 1CRI being tested (hereinafter (A*,B*), A* representing a set of values of a referenced column or columns and B* representing a set of values of a referencing column or columns) until (A*,B*) is disqualified or until all the disqualification tests have been executed and (A*,B*) has not been disqualified, in which case (A*,B*) is added to the list of non-disqualified 1CRIs, wherein each of the disqualification tests reduces the likelihood of incorrectly adding (A*,B*) to the list of non-disqualified 1CRIs;
the database system applying a qualifying test to the non-disqualified 1CRIs resulting in a list of qualified 1CRIs;
the database system defining a referential integrity constraint between the referenced column and the referencing column of one of the qualified 1CRIs that is confirmed by a user to be a referential integrity constraint; and
the database system using the referential integrity constraint to optimize execution of a query received by the database system.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] J. Bauckmann, U. Leser, F. Naumann, and V. Tietz. Efficiently Detecting Inclusion Dependencies. In ICDE, pages 1448-1450 (2007).

[2] F. D. Marchi, S. Lopes, and J.-M. Petit. Unary and n-ary inclusion dependency discovery in relational databases. Journal of Intelligent Information Systems, 32(1):53-73 (2009).

[3] S. Lopes, J.-M. Petit, and F. Toumani. Discovering interesting inclusion dependencies: application to logical database tuning. Information Systems, 27(1):1-19 (2002).

[4] F. D. Marchi and J.-M. Petit. Zigzag: anew algorithm for mining large inclusion dependencies in databases. ICDM, p.27-34, (2003).

[5] A. Rostin, O. Albrecht, J. Bauckmann, F. Naumann, U. Leser: A Machine Learning Approach to Foreign Key Discovery. WebDB (2009).

[6] U.S. patent application Ser. No. 17/965,250, entitled "Multi-Parameter Data Type Frameworks for Database Environments and Database Systems," by Sung Jin Kim, et al., filed Oct. 13, 2022.

[7] U.S. patent application Ser. No. 18/147,851, entitled "Delimiter Determination in Input Data," by Sung Jin Kim, et al. filed Dec. 29, 2022.

[8] en.wikipedia.org/wiki/Bloom_filter

[9] www.learndatasci.com/glossary/jaccard-similarity/

What is claimed is:

1. A method comprising:

executing a plurality of processes on a plurality of compute groups,
wherein each compute group comprises one or more compute clusters,
wherein each compute cluster comprises one or more nodes,
wherein each node comprises at least one computer processor and a memory,
wherein the plurality of processes store data on a data storage;

a database system executing as at least one of the plurality of processes;

the database system configured to issue executable steps to at least one of the processes executing as part of the database system, the database system receiving a database comprising one or more relations comprising a plurality of input columns;

the database system enumerating one-column candidate referential integrities (1CRIs) from the plurality of input columns in the one or more relations, wherein each 1CRI includes a referenced column (A) having a plurality of referenced-column values and a referencing column (B) having a plurality of referencing column values;

the database system applying one or more disqualification tests to the 1CRIs to eliminate illegitimate 1CRIs resulting in a list of non-disqualified 1CRIs, wherein the disqualification tests are applied to an 1CRI being tested (hereinafter (A*,B*), A* representing a set of values of a referenced column or columns and B* representing a set of values of a referencing column or columns) until (A*,B*) is disqualified or until all of the disqualification tests have been executed and (A*,B*) has not been disqualified, in which case (A*,B*) is added to the list of non-disqualified 1CRIs, wherein each of the disqualification tests reduces the likelihood of incorrectly adding (A*,B*) to the list of non-disqualified 1CRIs;

wherein the disqualification tests include a minimum coverage disqualification test, that includes one or more of the following sub-tests:

(d1) using cardinality sub-test, in which (A*,B*) is disqualified if:
$NUV_{B*}/NUV_{A*} >$ a domain-coverage threshold, where $NUV_{B*}$ is a number of unique values in B* and $NUV_{A*}$ is a number of unique values in A*, and
$CARD(Bloom_{A*} \cap Bloom_{B*})/CARD(Bloom_{A*})$, where $\cap$ represents a bitwise AND, CARD is a function having an argument that computes the number of bits in the argument that are set to 1, $Bloom_{A*}$ is a Bloom filter of A*, and $Bloom_{B*}$ is a Bloom filter of B*, and (d2) using Min Hash sub-test, in which in which (A*,B*) is disqualified if $(MH(A*,B*)\cdot(NUV_{A*}+NUV_{B*})/(MH(A*,B*)+1))/NUV_{A*}$ is less than a min-hash threshold, where MH(A*,B*) is a statistic available from the database system;

the database system applying a qualifying test to the non-disqualified 1CRIs resulting in a list of qualified 1CRIs;

the database system defining a referential integrity constraint between the referenced column and the referencing column of one of the qualified 1CRIs that is confirmed by a user to be a referential integrity constraint; and the database system using the referential integrity constraint to optimize execution of a query received by the database system.

2. The method of claim 1 further comprising the database system rejecting an action regarding the database that violates the referential integrity constraint.

3. The method of claim 1 wherein the qualifying test identifies a non-disqualified 1CRI as a qualified 1CRI if more than a qualification-number-threshold number of referenced-column values in the non-disqualified pair are included in the referencing-column values.

4. The method of claim 1 wherein enumerating the 1CRIs includes iteratively pairing each of the plurality of input columns with every other of the plurality of input column.

5. The method of claim 1 wherein the disqualification tests include a domain inclusion disqualification test, that includes one or more of the following sub-tests:

(a1) data type domain match sub-test, in which (A*,B*) is disqualified if a data type of B* is larger than a data type of A*, (a2) max-values sub-test, in which (A*,B*) is disqualified if:
one of an n greatest values of B* is not among an n greatest values of A*, and
one of the n greatest values of B* is greater than an nth greatest value of A*, (a3) min-values sub-test, in which (A*,B*) is disqualified if:
one of an m smallest values of B* is not among an m smallest values of A*, and
one of the m smallest values of B* is smaller than an mth smallest value of A*, (a4) Bloom-filter sub-test, in which (A*,B*) is disqualified if a Bloom filter of A* is not a superset of a Bloom filter of B*, and (a5) number of unique values sub-test, in which (A*,B*) is disqualified if a number of unique values of B* is greater than a number of unique values of A*.

6. The method of claim 1 wherein the disqualification tests include a surrogate key discordance test for A* that includes one or more of the following sub-tests:

(b1) value start-distance sub-test, in which (A*,B*) is disqualified if:
a smallest value in A*, an average gap between values in A*, and a standard deviation of value differences between consecutive values in A* indicate that A* is a surrogate key, (b2) end-of-a-spectrum sub-test, in which (A*,B*) is disqualified if:
an m smallest values in A*<=a square root of a number of unique values in A* ($NUV_{A*}$) and
an m greatest values in A*>$NUV_{A*}$−the square root of $NUV_{A*}$,
where m<=the square root of $NUV_{A*}$ and $NUV_{A*}>4$, and (b3) synthetic key similarity sub-test, in which (A*,B*) is disqualified if:
a similarity of A* and C* is greater than a key-similarity-threshold,
where C* is a set of possible surrogate key values.

7. The method of claim 1 wherein the disqualification tests include a minimum support test, in which (A*,B*) is disqualified if a cardinality of B* is less than a minimum-support threshold.

8. The method of claim 1 further comprising identifying n-column referential integrities (nCRIs) by:
   the database system enumerating nCRIs among n−1 column CRIs to produce nCRIs, each nCRI having referenced columns and referencing columns; and
   the database system applying one or more reduction rules to the nCRIs to eliminate illegitimate nCRIs resulting in a reduced set of nCRIs, wherein the reduction rules are applied to a nCRI under consideration (nCRIUC) until the nCRIUC fails a reduction rules and is found to be illegitimate or until all the reduction rules have been run against the nCRIUC without finding the nCRIUC to be illegitimate, in which case the nCRIUC is added to the reduced set of nCRIs, wherein the reduction rules include:
   (a) an nCRIUC is found to be illegitimate if referenced columns in the nCRIUC are not different columns or if they do not belong to a same relation,
   (b) an nCRIUC is found to be illegitimate if referencing columns in the nCRIUC are not different columns or if they do not belong to a same relation,
   (c) an nCRIUC is found to be illegitimate if referenced columns in the nCRIUC and referencing columns in the nCRIUC include one or more common columns,
   the database system applying the disqualification tests to the reduced set of nCRIs to produce nth-level non-disqualified nCRIs.

9. The method of claim 1 wherein the one or more disqualification tests uses two or more of the following statistics about $(A^*,B^*)$:
   a data type of $A^*$,
   a data type of $B^*$,
   a number of unique values in $A^*$($NUV_{A^*}$),
   a number of unique values in $B^*$($NUV_{B^*}$),
   a number of unique values in the intersection of $A^*$ and $B^*$($NUV_{A^* \cap B^*}$),
   a MinHash$(A^*,B^*)$ (abbreviated MH$(A^*,B^*)$),
   an n greatest values in $A^*$,
   an n greatest values in $B^*$,
   an m smallest values in $A^*$,
   an m smallest values in $B^*$,
   a Bloom filter of $A^*$(Bloom$_{A^*}$),
   a Bloom filter of $B^*$(Bloom$_{B^*}$),
   a smallest value in $A^*$,
   an average gap between consecutive values in $A^*$, defined to be a sum of gaps between consecutive $A^*$ values divided by $NUV_{A^*}-1$,
   a standard deviation of differences between consecutive values in $A^*$,
   a cardinality of $A^*$, and
   a cardinality of $B^*$.

10. A non-transitory computer-readable tangible medium, on which is recorded a computer program, the computer program comprising executable instructions, that, when executed, perform a method comprising:
   executing a plurality of processes on a plurality of compute groups,
      wherein each compute group comprises one or more compute clusters,
      wherein each compute cluster comprises one or more nodes,
      wherein each node comprises at least one computer processor and a memory,
      wherein the plurality of processes store data on a data storage;
   a database system executing as at least one of the plurality of processes;
   the database system configured to issue executable steps to at least one of the processes executing as part of the database system,
   the database system receiving a database comprising one or more relations comprising a plurality of input columns;
   the database system enumerating one-column candidate referential integrities (1CRIs) from the plurality of input columns in the one or more relations, wherein each 1CRI includes a referenced column (A) having a plurality of referenced-column values and a referencing column (B) having a plurality of referencing column values;
   the database system applying one or more disqualification tests to the 1CRIs to eliminate illegitimate 1CRIs resulting in a list of non-disqualified 1CRIs, wherein the disqualification tests are applied to an 1CRI being tested (hereinafter $(A^*,B^*)$, $A^*$ representing a set of values of a referenced column or columns and $B^*$ representing a set of values of a referencing column or columns) until $(A^*,B^*)$ is disqualified or until all of the disqualification tests have been executed and $(A^*,B^*)$ has not been disqualified, in which case $(A^*,B^*)$ is added to the list of non-disqualified 1CRIs, wherein each of the disqualification tests reduces the likelihood of incorrectly adding $(A^*,B^*)$ to the list of non-disqualified 1CRIs;
   wherein the disqualification tests include a minimum coverage disqualification test, that includes one or more of the following sub-tests:
   (d1) using cardinality sub-test, in which $(A^*,B^*)$ is disqualified if:
      $NUV_{B^*}/NUV_{A^*} >$ a domain-coverage threshold, where $NUV_{B^*}$ is a number of unique values in $B^*$ and $NUV_{A^*}$ is a number of unique values in $A^*$, and
      CARD(Bloom$_{A^*} \cap$ Bloom$_{B^*}$)/CARD(Bloom$_{A^*}$),
      where $\cap$ represents a bitwise AND, CARD is a function having an argument that computes the number of bits in the argument that are set to 1, Bloom$_{A^*}$ is a Bloom filter of $A^*$, and Bloom$_{B^*}$ is a Bloom filter of $B^*$, and
   (d2) using Min Hash sub-test, in which in which $(A^*,B^*)$ is disqualified if $(MH(A^*,B^*) \cdot (NUV_{A^*} + NUV_{B^*})/(MH(A^*,B^*)+1))/NUV_{A^*}$ is less than a min-hash threshold, where MH$(A^*,B^*)$ is a statistic available from the database system;
   the database system applying a qualifying test to the non-disqualified 1CRIs resulting in a list of qualified 1CRIs;
   the database system defining a referential integrity constraint between the referenced column and the referencing column of one of the qualified 1CRIs that is confirmed by a user to be a referential integrity constraint; and
   the database system using the referential integrity constraint to optimize execution of a query received by the database system.

11. The non-transitory computer-readable tangible medium of claim 10 further comprising the database system rejecting an action regarding the database that violates the referential integrity constraint.

12. The non-transitory computer-readable tangible medium of claim 10 wherein the qualifying test identifies a non-disqualified 1CRI as a qualified 1CRI if more than a qualification-number-threshold number of referenced-column values in the non-disqualified pair are included in the referencing-column values.

13. The non-transitory computer-readable tangible medium of claim 10 wherein enumerating the 1CRIs includes iteratively pairing each of the plurality of input columns with every other of the plurality of input column.

14. The non-transitory computer-readable tangible medium of claim 10 wherein the disqualification tests include a domain inclusion disqualification test, that includes one or more of the following sub-tests:
   (a1) data type domain match sub-test, in which (A*,B*) is disqualified if a data type of B* is larger than a data type of A*,
   (a2) max-values sub-test, in which (A*,B*) is disqualified if:
      one of an n greatest values of B* is not among an n greatest values of A*, and
      one of the n greatest values of B* is greater than an nth greatest value of A*,
   (a3) min-values sub-test, in which (A*,B*) is disqualified if:
      one of an m smallest values of B* is not among an m smallest values of A*, and
      one of the m smallest values of B* is smaller than an mth smallest value of A*,
   (a4) Bloom-filter sub-test, in which (A*,B*) is disqualified if a Bloom filter of A* is not a superset of a Bloom filter of B*, and
   (a5) number of unique values sub-test, in which (A*,B*) is disqualified if a number of unique values of B* is greater than a number of unique values of A*.

15. The non-transitory computer-readable tangible medium of claim 10 wherein the disqualification tests include a surrogate key discordance test for A* that includes one or more of the following sub-tests:
   (b1) value start-distance sub-test, in which (A*,B*) is disqualified if:
      a smallest value in A*, an average gap between values in A*, and a standard deviation of value differences between consecutive values in A* indicate that A* is a surrogate key,
   (b2) end-of-a-spectrum sub-test, in which (A*,B*) is disqualified if:
      an m smallest values in A*<=a square root of a number of unique values in A* ($NUV_{A*}$) and
      an m greatest values in A*>$NUV_A$*- the square root of $NUV_A$*,
      where m<=the square root of $NUV_A$*and $NUV_A$*>4, and
   (b3) synthetic key similarity sub-test, in which (A*,B*) is disqualified if:
      a similarity of A* and C* is greater than a key-similarity-threshold,
      where C* is a set of possible surrogate key values.

16. The non-transitory computer-readable tangible medium of claim 10 wherein the disqualification tests include a minimum support test, in which (A*,B*) is disqualified if a cardinality of B* is less than a minimum-support threshold.

17. The non-transitory computer-readable tangible medium of claim 10 further comprising identifying n-column referential integrities (nCRIs) by:
   the database system enumerating nCRIs among n−1 column CRIs to produce nCRIs, each nCRI having referenced columns and referencing columns; and
   the database system applying one or more reduction rules to the nCRIs to eliminate illegitimate nCRIs resulting in a reduced set of nCRIs, wherein the reduction rules are applied to a nCRI under consideration (nCRIUC) until the nCRIUC fails a reduction rules and is found to be illegitimate or until all the reduction rules have been run against the nCRIUC without finding the nCRIUC to be illegitimate, in which case the nCRIUC is added to the reduced set of nCRIs, wherein the reduction rules include:
      (a) an nCRIUC is found to be illegitimate if referenced columns in the nCRIUC are not different columns or if they do not belong to a same relation,
      (b) an nCRIUC is found to be illegitimate if referencing columns in the nCRIUC are not different columns or if they do not belong to a same relation,
      (c) an nCRIUC is found to be illegitimate if referenced columns in the nCRIUC and referencing columns in the nCRIUC include one or more common columns,
   the database system applying the disqualification tests to the reduced set of nCRIs to produce nth-level non-disqualified nCRIs.

18. An article of manufacture comprising:
   a system executing a plurality of processes on a plurality of compute groups,
      wherein each compute group comprises one or more compute clusters,
      wherein each compute cluster comprises one or more nodes,
      wherein each node comprises at least one computer processor and a memory,
      wherein the plurality of processes store data on a data storage;
   a database system executing as at least one of the plurality of processes;
   the database system configured to issue executable steps to at least one of the processes executing as part of the database system,
   the database system receiving a database comprising one or more relations comprising a plurality of input columns;
   the database system enumerating one-column candidate referential integrities (1CRIs) from the plurality of input columns in the one or more relations, wherein each 1CRI includes a referenced column (A) having a plurality of referenced-column values and a referencing column (B) having a plurality of referencing column values;
   the database system applying one or more disqualification tests to the 1CRIs to eliminate illegitimate 1CRIs resulting in a list of non-disqualified 1CRIs, wherein the disqualification tests are applied to an 1CRI being tested (hereinafter (A*,B*), A* representing a set of values of a referenced column or columns and B* representing a set of values of a referencing column or columns) until (A*,B*) is disqualified or until all of the disqualification tests have been executed and (A*,B*) has not been disqualified, in which case (A*,B*) is added to the list of non-disqualified 1CRIs, wherein each of the disqualification tests reduces the likelihood of incorrectly adding (A*,B*) to the list of non-disqualified 1CRIs;
   wherein the disqualification tests include a minimum coverage disqualification test, that includes one or more of the following sub-tests:
      (d1) using cardinality sub-test, in which (A*,B*) is disqualified if:

$NUV_{B*}/NUV_{A*} >$ a domain-coverage threshold, where $NUV_{B*}$ is a number of unique values in B* and $NUV_{A*}$ is a number of unique values in A*, and $CARD(Bloom_{A*} \cap Bloom_{B*})/CARD(Bloom_{A*})$, where $\cap$ represents a bitwise AND, CARD is a function having an argument that computes the number of bits in the argument that are set to 1, $Bloom_{A*}$ is a Bloom filter of A*, and $Bloom_{B*}$ is a Bloom filter of B*, and (d2) using Min Hash sub-test, in which in which (A*,B*) is disqualified if $(MH(A*,B*) \cdot (NUV_{A*} + NUV_{B*})/(MH(A*,B*)+1))/NUV_{A*}$ is less than a min-hash threshold, where $MH(A*,B*)$ is a statistic available from the database system;

the database system applying a qualifying test to the non-disqualified 1CRIs resulting in a list of qualified 1CRIs;

the database system defining a referential integrity constraint between the referenced column and the referencing column of one of the qualified 1CRIs that is confirmed by a user to be a referential integrity constraint; and the database system using the referential integrity constraint to optimize execution of a query received by the database system.

\* \* \* \* \*